US012626491B2

(12) United States Patent
Wang et al.

(10) Patent No.: US 12,626,491 B2
(45) Date of Patent: May 12, 2026

(54) METHOD FOR DETECTING OBJECT OF ESOPHAGEAL CANCER IN HYPERSPECTRAL IMAGING

(71) Applicant: NATIONAL CHUNG CHENG UNIVERSITY, Chiayi County (TW)

(72) Inventors: Hsiang-Chen Wang, Chiayi City (TW); Ting-Chun Men, Kaohsiung City (TW); Yu-Ming Tsao, Chiayi County (TW); Yu-Lin Liu, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 523 days.

(21) Appl. No.: 18/165,586

(22) Filed: Feb. 7, 2023

(65) Prior Publication Data

US 2023/0281962 A1      Sep. 7, 2023

(30) Foreign Application Priority Data

Mar. 4, 2022    (TW) ................................... 111108095

(51) Int. Cl.
| | |
|---|---|
| *G06V 10/77* | (2022.01) |
| *G06V 10/75* | (2022.01) |
| *G06V 10/82* | (2022.01) |

(52) U.S. Cl.
CPC ........ *G06V 10/7715* (2022.01); *G06V 10/751* (2022.01); *G06V 10/82* (2022.01)

(58) Field of Classification Search
CPC .. G06V 10/7715; G06V 10/751; G06V 10/82; G06V 10/454; G06V 10/255;

(Continued)

(56) References Cited

U.S. PATENT DOCUMENTS 12,067,716 B2 * 8/2024 Hu ........................ G06T 7/0012
2021/0390704 A1 * 12/2021 Fujimoto et al. ......... G06T 7/11

(Continued)

OTHER PUBLICATIONS

Internet blog "What is YOLOv5? A Guide for Beginners", published Jun. 29, 2020 by Jacob Solawetz (Year: 2020).*

(Continued)

*Primary Examiner* — Matthew C Bella
*Assistant Examiner* — Daniel Joseph Santos
(74) *Attorney, Agent, or Firm* — Rosenberg, Klein & Lee

(57) ABSTRACT

A method for detecting objects in hyperspectral imaging is revealed. First obtaining a hyperspectral imaging information by a reference image. Then converting an input image according to the hyperspectral imaging information to get a hyperspectral image. A plurality of hyperspectral eigenvalues is obtained after image analysis of the hyperspectral image. Next getting a plurality of dimensionality reduction eigenvalues by a principal component analysis (PCA). Then performing convolution operation on the dimensionality reduction eigenvalues to get a value of a convolution matrix for extracting a feature image from an image of an object to be detected in the input image. Generating an anchor box and a prediction box in the feature image to get a bounded image. Lastly matching and comparing the bounded image with a sample image to determine whether the input image is a target object image. Thereby the method provides assistance for physicians in gastrointestinal image diagnosis.

11 Claims, 17 Drawing Sheets

(58) Field of Classification Search
CPC .. G06V 10/58; G06T 7/77; G06T 7/90; G06T
2207/20076; G06T 7/0014; G06T 7/74;
G06T 2207/10068; G06T 2207/20081;
G06T 2207/20084; G06T 2207/30096;
Y02A 40/10
USPC ....................................................... 382/181
See application file for complete search history.

(56) References Cited

U.S. PATENT DOCUMENTS

| | | | |
|---|---|---|---|
| 2022/0207282 A1* | 6/2022 | Dong et al. .......... | G06K 9/3241 |
| 2022/0398814 A1* | 12/2022 | Gustin et al. ......... | G06T 19/006 |
| 2023/0127009 A1* | 4/2023 | Gilmutdinov et al. ...................... G06V 20/41 |  |
| 2023/0207134 A1* | 6/2023 | Hedge et al. .......... | G16H 50/30 |
| 2023/0239583 A1* | 7/2023 | Vercauteren et al. ...................... H04N 23/483 |  |
| 2023/0252761 A1* | 8/2023 | Du et al. .............. | G06V 10/764 |
| 2023/0368398 A1* | 11/2023 | Figueroa-Alvarez et al. .............. G06T 7/215 |  |
| 2025/0184584 A1* | 6/2025 | Liang et al. ........... | H04N 23/16 |

OTHER PUBLICATIONS

"A Clinically Translatable Hyperspectral Endoscopy (HySE) System For Imaging The Gastrointestinal Tract", by Jonghee Yoon et al., published in 2019 in Nat Commun 10, 1902 (2019), https://doi.org/10.1038/s41467-019-09484-4 (Year: 2019).*

"Dual-modality Endoscopic Probe for Tissue Surface Shape Reconstruction and Hyperspectral Imaging Enabled By Deep Neural Networks", by Jianyu Lin et al., published in 2018 in Medical Image Analysis, vol. 48, pp. 162-176 (Year: 2018).*

\* cited by examiner

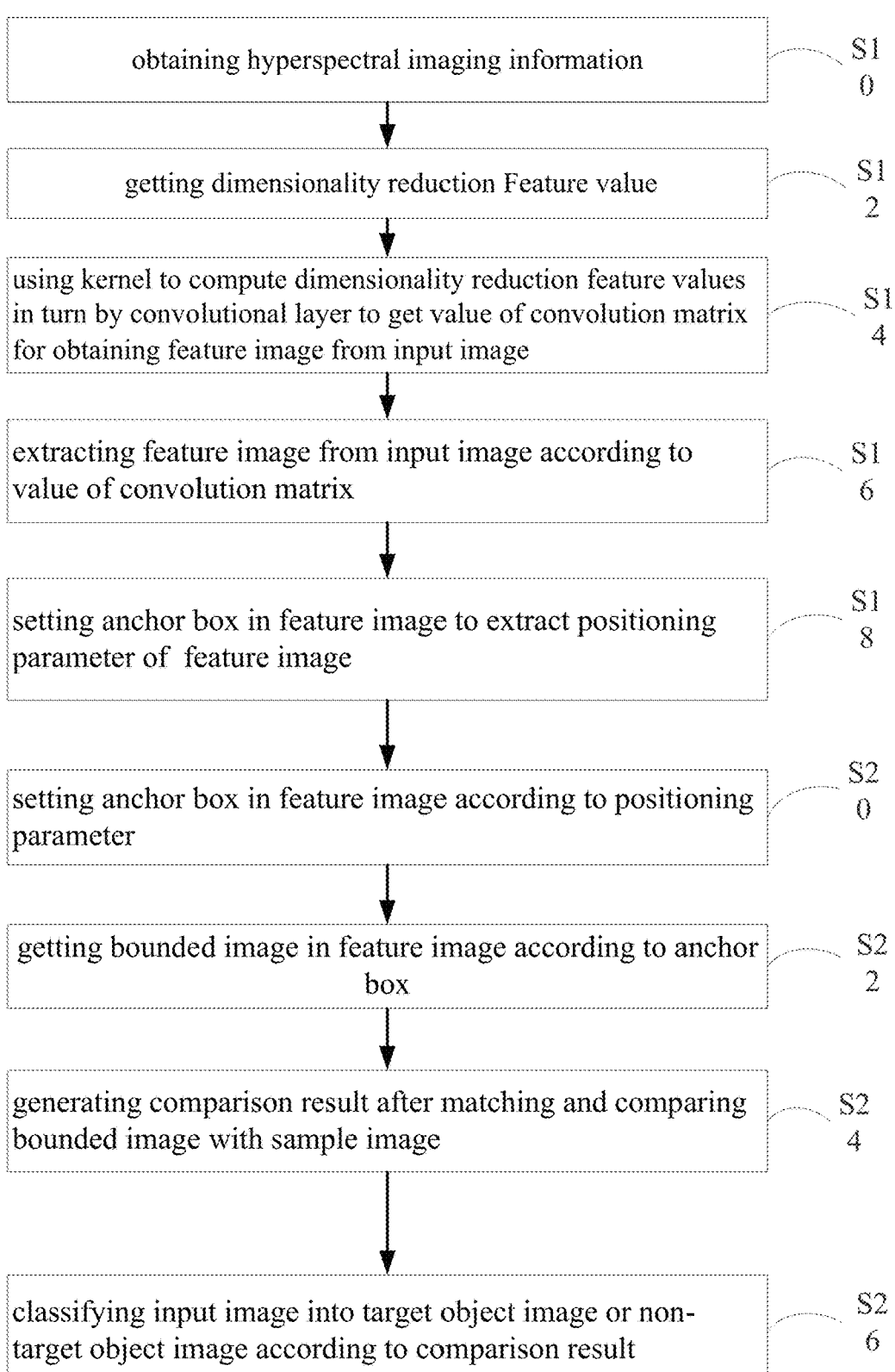

obtaining hyperspectral imaging information    S10 getting dimensionality reduction Feature value    S12 using kernel to compute dimensionality reduction feature values in turn by convolutional layer to get value of convolution matrix for obtaining feature image from input image    S14 extracting feature image from input image according to value of convolution matrix    S16 setting anchor box in feature image to extract positioning parameter of feature image    S18 setting anchor box in feature image according to positioning parameter    S20 getting bounded image in feature image according to anchor box    S22 generating comparison result after matching and comparing bounded image with sample image    S24 classifying input image into target object image or non-target object image according to comparison result    S26

Fig. 1A

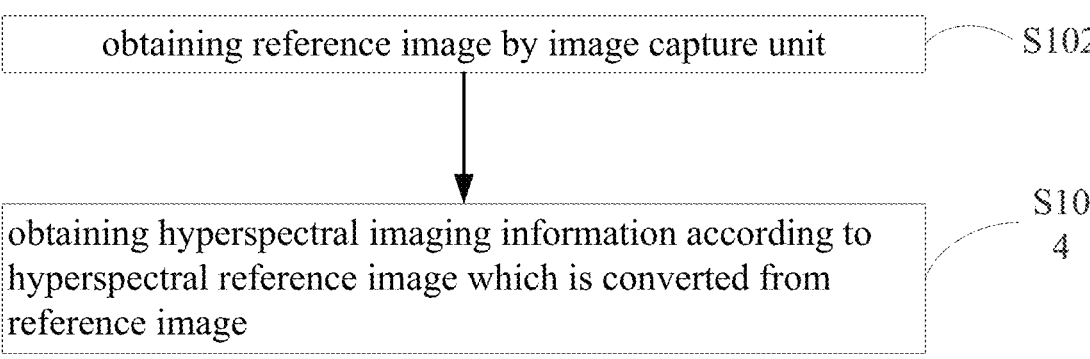

obtaining reference image by image capture unit     S102 obtaining hyperspectral imaging information according to hyperspectral reference image which is converted from reference image     S104

Fig. 1B

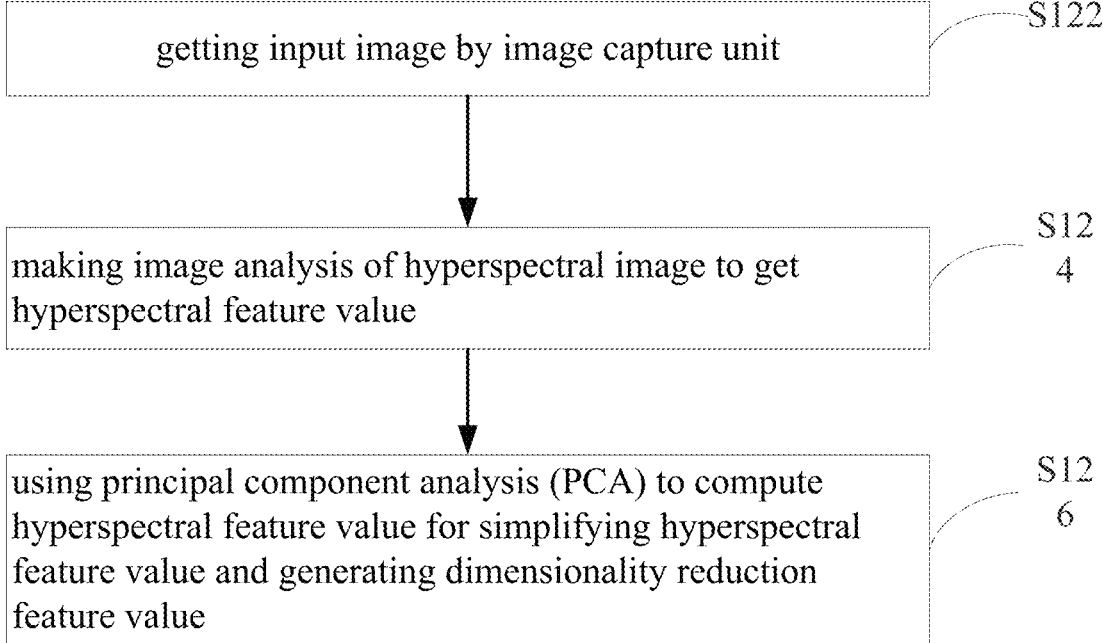

getting input image by image capture unit     S122 making image analysis of hyperspectral image to get hyperspectral feature value     S124 using principal component analysis (PCA) to compute hyperspectral feature value for simplifying hyperspectral feature value and generating dimensionality reduction feature value     S126

Figure 2C:
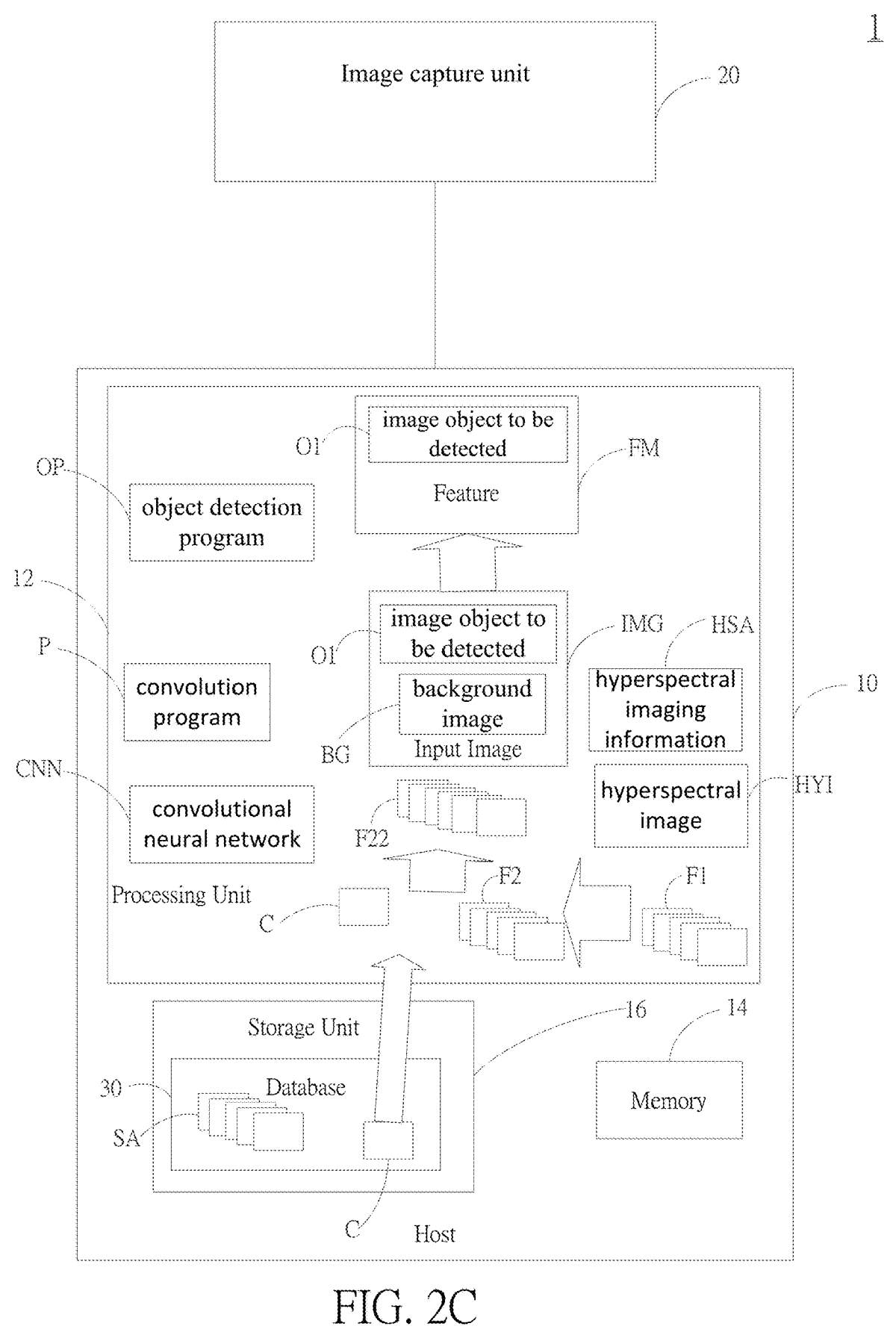

Image capture unit — 20

OP — object detection program

OI — image object to be detected

FM — Feature

12 —

P — convolution program

OI — image object to be detected

BG — background image

Input Image

IMG —

HSA — hyperspectral imaging information

10 —

CNN — convolutional neural network

Processing Unit

F22

C

F2

F1

HYI — hyperspectral image

Storage Unit — 16

14

30 — Database

SA

Memory

C — Host

Conv

Input

Convolution Layer

BN Layer

SiLU Layer

Output

METHOD FOR DETECTING OBJECT OF ESOPHAGEAL CANCER IN HYPERSPECTRAL IMAGING

FIELD OF THE INVENTION

The present invention relates to an image recognition method, especially to a method for detecting objects of the esophageal cancer in hyperspectral imaging.

BACKGROUND OF THE INVENTION

The esophagus is a tubular organ which connects the pharynx to the stomach for sending food ingested through the mouth to the stomach. The normal esophageal mucosa includes multiple layers of squamous epithelial cells with thickness of 200-5001 μm. The multiple layers consist of epithelium (EP), lamina propria mucosae (LPM), muscularis mucosae (MM), submucosa (SM), and muscularis propria (MP) from top to bottom. Esophageal cancer is the eighth most common cancer worldwide. Carcinoma is a malignancy that develops from epithelial cells. Cancer, also called malignant tumor, has certain impact on physiological functions and further includes sarcoma, lymphoma, leukemia, melanoma, carcinosarcoma, malignant glioma, etc.

Sarcoma is a type of cancer that arises in body's connective tissues, which include fibrous tissue, fat, muscle, blood vessels, bones, and cartilage. Lymphoma and leukemia are hematologic malignancies while melanoma develops in skin cells. Carcinosarcomas are malignant tumors that consist of a mixture of epithelial cancer and connective tissue cancer. As to malignant glioma, it is a type of nerve tissue cancer. In esophageal cancer, malignant cells not only infiltrate in epithelial tissue of esophagus but also in connective tissue at advanced stage.

Most of medical techniques for disease diagnosis available now depend on a single type of indicator or a piece of information such as temperature, blood pressure, and body scan images. For example, in order to detect serious diseases such as cancer, the most common medical device used now is image-based equipment including X-ray, computer tomography (CT) scan, nuclear magnetic resonance (NMR) imaging, etc. Various combinations of these techniques are useful in disease diagnosis in some degrees. Yet early detection of the serious diseases by the respective techniques is not so accurate, reliable, effective and economical while being used alone. Moreover, most of the devices are invasive and having larger volume such as those using X-ray, CT, and NMR. Thus, more compact and accurate devices such as endoscope have been developed and used to observe lesions on different systems such as gastrointestinal system.

Furthermore, detection of esophageal cancer at early stage is not easy. Besides nearly no symptoms, a part of people with subtle changes such as a bit change in colors of the tissue are unable to be identified even using endoscopic examination. Thus, a certain number of early-stage lesions are not diagnosed and thus the treatment is delayed. ○ In order to detect lesions which are not easy to spot, several techniques including lugol chromoendoscopy, narrow band image (NBI), and magnifying endoscopy have been developed.

However, the endoscopic examination is complicated and labor-intensive so that medical staff working in endoscopy must be licensed. Physicians need to detect lesions and interpret the image during the operation. Even both the endoscopy and the examination process have been improved over years, the problems such as human errors in operations and the endoscopic images are hard to interpret for physicians are still there.

Thus, there is a room for improvement and there is a need to provide a novel method for detecting objects in hyperspectral imaging by which an input image is classified into a target object image or not in order to avoid difficulties in endoscopic image recognition and interpretation. A host is used to perform convolution operation in a convolutional neural network (CNN) on an input image to get a feature image. Then a bounded image containing an object to be detected is calculated and compared with a sample image so as to classify the input image into a target object image or not.

SUMMARY OF THE INVENTION

A primary object of the present invention to provide a method for detecting objects in hyperspectral imaging which obtains feature images by convolutional neural network computation of hyperspectral images. Then a bounded image containing an object to be detected is obtained by object detection. Next whether an input image is classified into a target object image or not is determined by comparing the bounded image with a sample image. Thereby the present method provides assistance for physicians in endoscopic image diagnosis.

In order to achieve the above object, a method for detecting objects in hyperspectral imaging according to the present invention which includes a plurality of steps run by a host. First run a step of obtaining a hyperspectral imaging information. The host gets a reference image. After the reference image converted into a reference hyperspectral image, a hyperspectral imaging information is obtained according to the reference hyperspectral image. Then run a step of getting a plurality of dimensionality reduction eigenvalues (characteristic value). The host uses using an image capture unit to capture an input image which includes at least one image of an object to be detected. The input image is converted according to the hyperspectral imaging information to get a hyperspectral image. Next make an image analysis of the hyperspectral image to get a plurality of hyperspectral eigenvalues. Then the host uses principal component analysis (PCA) to compute the hyperspectral eigenvalues for getting a plurality of dimensionality reduction eigenvalues correspondingly by dimensionality reduction of the hyperspectral eigenvalues. Later use a kernel to compute the dimensionality reduction eigenvalues (characteristic value) in turn in/by at least one convolutional layer to get a value of a convolution matrix. The kernel includes a plurality of feature weight parameters and the value of the convolution matrix is equal to the feature weight parameters multiplied by the dimensionality reduction eigenvalues. The feature image is corresponding to the value of the convolution matrix. Then at least one feature image is extracted from the input image according to the value of the convolution matrix and set at least one anchor box in the feature image for extraction of a plurality of positioning parameters corresponding to the feature image. Next generate at least one prediction box in the feature image according to the positioning parameters and capture a corresponding bounded image. Then map and compare the bounded image with at least one sample image to generate a comparison result. Thereby the host classifies the input image into a target object image or a non-target object image according to the comparison result. Therefore, the present method performs feature detection of the target object image by operations of convolution kernels in the host and then the host classifies the input image into a target object image or a non-target object image according to the comparison of the sample image with the bounded image selected by the prediction box.

Preferably, in the step of matching and comparing the bounded image with at least one sample image to generate a comparison result, the host matches and compares the bounded image with the sample image to generate the comparison result by an object detection algorithm YOLOv5.

Preferably, the hyperspectral imaging information is composed of a plurality of color matching functions (CMF), a correction matrix, and a conversion matrix which are corresponding to the input image.

Preferably, in the step of matching and comparing the bounded image with at least one sample image to generate a comparison result, the host reads the at least sample image for matching and comparing the bounded image in the input image with the sample image.

Preferably, the anchor box is corresponding to the at least one aspect ratio which is a ratio between a length and a width.

Preferably, in the step of setting at least one prediction box in the feature image according to the plurality of positioning parameters, the host generates a plurality of corresponding prediction boxes according to a plurality of anchor boxes of different target sizes.

Preferably, in the step of extracting at least one feature image from the input image, the host further extracts the feature images from the input image and then performs random zooming, random cropping, and random arrangement of these feature matches for connecting the feature matches to form a split joint image. Next run a step of generating a plurality of grid cells according to the feature image.

Preferably, in the step of setting at least one prediction box in the feature image according to the positioning parameters, the host performs screening according to the positioning parameters and filter out a position parameter of the prediction box from maximum values of the positioning parameters. Then the host gets a shift amount according to a positioning index and an aspect parameter of the anchor box. Next the host further obtains the prediction box according to the position parameter and the shift amount.

Preferably, in the step of setting at least one prediction box in the feature image according to the plurality of positioning parameters, the host uses a plurality of scales including ⅛, 1/16, 1/32, and their combinations to screen the positioning parameters.

Preferably, in the principal component analysis (PCA), the host extracts a maximum variance according to a hyperspectral vector to which the hyperspectral eigenvalues correspond and then the dimensionality reduction eigenvalues are generated.

Preferably, an object to be detected in the feature image is bounded by the prediction box.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1A shows a flow chart showing steps of image recognition of an embodiment according to the present invention;

FIG. 1B shows a flow chart showing steps of obtaining a hyperspectral imaging information of an embodiment according to the present invention;

FIG. 1C shows a flow chart showing steps of obtaining dimensionality reduction eigenvalues of an embodiment according to the present invention;

Figure 2A:
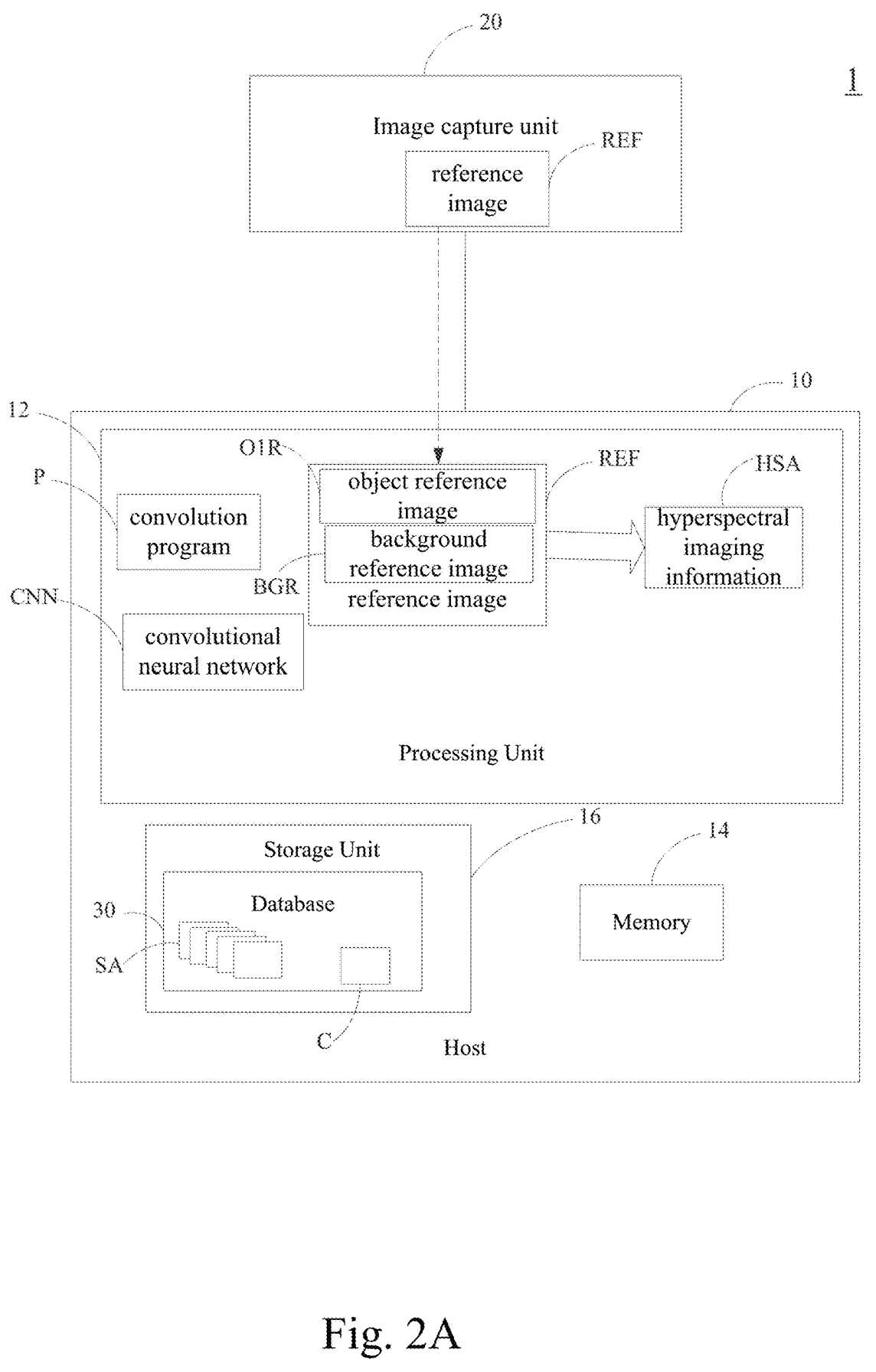

FIG. 2A-2G show schematic drawings showing a part of steps of an embodiment according to the present invention;

DETAILED DESCRIPTION OF THE PREFERRED EMBODIMENT

Figure 2B:
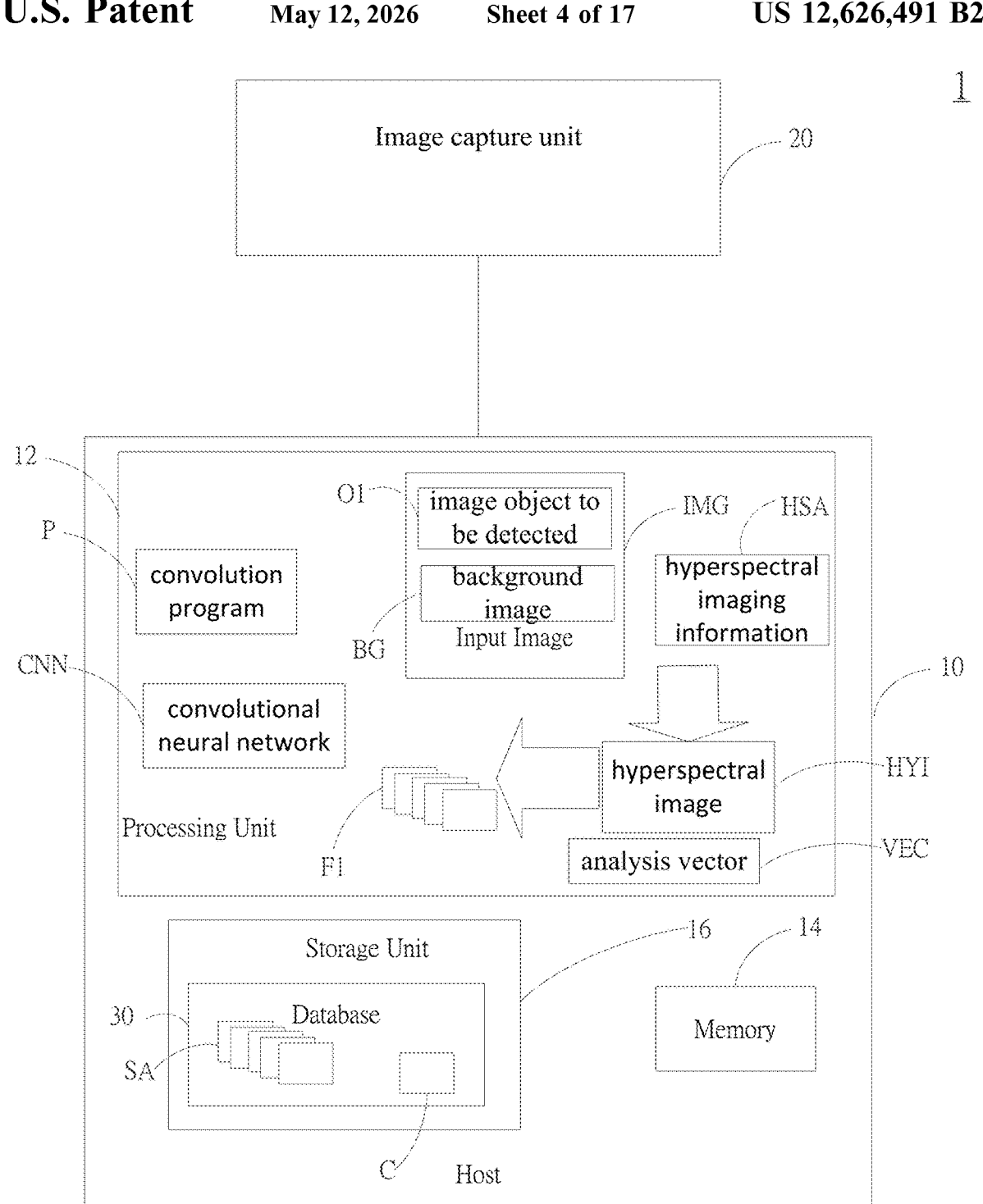

In order to learn features and functions of the present invention more clearly, please refer to the following embodiments and the related description.

In order to avoid errors in endoscopic operations caused by complexity of operation or difficulties in image recognition, a method for detecting objects in hyperspectral imaging according to the present invention is provided.

The following are embodiments used to describe features of the method for detecting objects in hyperspectral imaging according to the present invention and a system used in combination with the method.

Refer to FIG. 1A, a method for detecting objects in hyperspectral imaging according to the present invention includes the following steps run in a host.

Step S10: obtaining a hyperspectral imaging information;

Step S12: getting dimensionality reduction eigenvalues (characteristic values);

Step S14: using a kernel to compute dimensionality reduction eigenvalues (characteristic value) in turn by a convolutional layer to get a value of a convolution matrix for obtaining a feature image from an input image;

Step S16: extracting the feature image from the input image according to the value of the convolution matrix;

Step S18: setting an anchor box in the feature image to extract positioning parameters of the feature image;

Step S20: setting a prediction box in the feature image according to the positioning parameters;

Step S22: getting a bounded image in the feature image according to the prediction box; and Step S24: generating a comparison result after matching and comparing the bounded image with a sample image; and Step S26: classifying the input image into a target object image or a non-target object image according to the comparison result.

Refer to FIG. 1B, the step S10 further includes the following steps.

Step S102: obtaining a reference image by an image capture unit; and

Step S104: obtaining hyperspectral imaging information according to a hyperspectral reference image which is converted from the reference image.

Refer to FIG. 1C, a flow chart showing steps of getting dimensionality reduction eigenvalues is revealed. The step S12 further includes the following steps.

Step S122: getting an input image by an image capture unit;

Step S124: making an image analysis of a hyperspectral image to get hyperspectral eigenvalues;

Step S126: using principal component analysis (PCA) to compute the hyperspectral eigenvalues for simplifying the hyperspectral eigenvalues and generating dimensionality reduction eigenvalues.

Refer to FIG. 2A-2G, a detection system 1 used in combination with the above object detection method in hyperspectral imaging includes a host 10 and an image capture unit 20. In this embodiment, the host 10 is, but not limited to, a host computer composed of a processing unit 12, a memory 14 and a storage unit 16. The host 10 can also be electronic device with computing capabilities to perform operations such as servers, desktops, and tablets. A database 30 is built in the storage unit 16 or is an external storage device. In the host 10, a convolution program (P) and an object detection program (OP) are run by the processing unit 12 and a convolutional neural network (CNN) 126 is set up correspondingly. In this embodiment, the image capture unit 20 is an endoscope used to look deep into organs and tissues inside the body including cystoscope, gastroscope, colonoscope, bronchoscope, laparoscope, etc.

In the step S10, especially while executing the step S102, as shown in FIG. 2A, the host 10 is used to read a reference image REF captured by the image capture unit 20. The reference image REF includes at least one image of an object to be detected O1. The reference image REF can be a white light image or a narrow band image which is stored in the database 30, or reference color blocks of 24 color checkers captured by the image capture unit 20. In this embodiment, the image capture unit 20 is a white light endoscope (OLYMPUS EVIS LUCERA CV-260 SL) which gets the corresponding white light reference image or a narrow band imaging endoscope (OLYMPUS EVIS LUCERA CLV-260) which gets the corresponding narrow band image.

As shown in FIG. 2A, the host 10 runs the step S104 to get a hyperspectral imaging information HSA according to the reference image REF. Visible Hyperspectral Algorithm (VIS-HAS) is used to compute the input image captured by the image capture unit 20 for getting a convert equation which converts general color space (color space of the captured image) to XYZ color space (CIE 1931 XYZ Color space) such as from sRGB to XYZ color space. The hyperspectral imaging information in the present invention is corresponding to visible wavelengths of visible Hyperspectral Algorithm and 24 color checkers (X-Rite Classic) which includes common primary colors in nature such as red, green, blue, and gray. The hyperspectral imaging information HAS is corresponding to the plurality of the white light images and the narrow band images mentioned above and composed of a plurality of color matching functions (CMF), a correction matrix C and a conversion matrix M.

For conversion, first the reference image REF and the spectrometer are converted into the same XYZ color space. A conversion equation for the reference image REF is as the following:

$$\begin{bmatrix} X \\ Y \\ Z \end{bmatrix} = [M_A][T] \begin{bmatrix} f(R_{SRGB}) \\ f(G_{SRGB}) \\ f(B_{SRGB}) \end{bmatrix} \times 100, 0 \le \begin{matrix} R_{SRGB} \\ G_{SRGB} \\ B_{SRGB} \end{matrix} \le 1 \qquad \text{equation 1}$$

wherein $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \qquad \text{equation 2}$$

$$f(n) = \begin{cases} \left(\dfrac{n+0.055}{1.055}\right), & n > 0.04045 \\ \left(\dfrac{n}{12.92}\right), & \text{otherwise} \end{cases} \qquad \text{equation 3}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \qquad \text{equation 4}$$

f(n) is gamma function, T is conversion matrix, [MA] is chromatic adaptation transform matrix ∘

An equation for conversion of reflection spectrum data captured by the spectrometer into the XYZ color space.

$$X = k \int_{380nm}^{780nm} S(\lambda)\, R(\lambda)\bar{x}(\lambda)d\lambda \qquad \text{equation 5}$$

$$Y = k \int_{380nm}^{780nm} S(\lambda)\, R(\lambda)\bar{y}(\lambda)d\lambda \qquad \text{equation 6}$$

$$Z = k \int_{380nm}^{780nm} S(\lambda)\, R(\lambda)\bar{z}(\lambda)d\lambda \qquad \text{equation 7}$$

wherein, k is obtained by the following equation 8

$$K = 100 \int_{380nm}^{780nm} S(\lambda)\bar{y}(\lambda)d\lambda \qquad \text{equation 8}$$

$\bar{x}(\lambda)$, $\bar{y}(\lambda)$, $\bar{z}(\lambda)$ are color matching functions; $S(\lambda)$ is a light source spectrum of the endoscope for shooting. In the XYZ color space, Y value is proportional to the brightness. Thus the maximum Y (maximum brightness) of the light source spectrum is obtained by the equation 8. Then a brightness ratio k is further obtained by specifying the upper limit of the Y value as 100. XYZ value $[XYZ_{Spectrum}]$ is further obtained by the equations 5-7.

Use the correction matrix C in the following equation 9 to perform correction of endoscopic images.

$$[C]=[XYZ_{Spectrum}]\times\text{pinv}([V]) \qquad \text{equation 9}$$

A variance matrix [V] is given by analysis of factors that cause errors in endoscope including nonlinear response and dark current of the endoscope, inaccurate color filter separation and color shift (such as white balance). Thereby the XYZ value $[XYZ_{Spectrum}]$ is corrected.

Correction of the non-linear response is carried out by using three-order equation because the narrow band images and white light images have similar values of third-order operational convolution matrix. The correction uses the following equation 10.

$$V_{Non-linear}=[X^3 Y^3 Z^3 X^2 Y^2 Z^2 XYZ1]^T \qquad \text{equation 10}$$

Generally, the dark current of the endoscope is a fixed value which is not changed significantly along with the changes in the amount of the light received. Thereby impact of the dark current is considered as a constant and a correction variance of the dark current is defined as VDark which is corrected by the following equation 11.

$$V_{Dark}=[\alpha] \qquad \text{equation 11}$$

A correction variance of the inaccurate color filter separation and color shift is defined as $V_{Color}$ while $\bar{x}(\lambda)$, $\bar{y}(\lambda)$, and $\bar{z}(\lambda)$ are color matching functions for conversion of RGB color space to XYZ color space. According to correlation among $\bar{x}(\lambda)$, $\bar{y}(\lambda)$, and $\bar{z}(\lambda)$, all possibilities among X, Y, and Z are listed in the form of combinations, as shown in the following equation 12 for correction of inaccurate color filter separation and color shift.

$$V_{Color}=[XYZ\ XY\ YZ\ XZ\ X\ Y\ Z]^T \qquad \text{equation 12}$$

The variance matrix V shown in the equation 13 below is obtained from the above equations 10-12.

$$V=[X^3 Y^3 Z^3 X^2 Y\ X^2 Z\ Y^2 Z\ XZ^2\ YZ^2\ XYZX^2\ Y^2 Z^2\ XY\ YZ$$
$$XZ\ X\ Y\ Z\ \alpha]^T \qquad \text{equation 13}$$

The corrected XYZ values $[XYZ_{Correct}]$ are obtained by the above variance matrix V in combination with the correction matrix C, as shown in the following equation 14.

$$[XYZ_{Correct}]=[C]\times[V] \qquad \text{equation 14}$$

As to the white light images, the average error value of $[XYZ_{Correct}]$ and $[XYZ_{Spectrum}]$ is 1.40. The average error of $[XYZ_{Correct}]$ and $[XYZ_{Spectrum}]$ in the narrow band images is 2.39.

The above calculation uses visible light wavelengths ranging from 380 nm to 780 nm. Thus, correction result of the endoscope is represented by color difference wherein $[XYZ_{Correct}]$ and $[XYZ_{Spectrum}]$ are converted to Lab color space which CIE DE2000 corresponds. The following equations 15-17 are color space conversion functions.

$$L^* = 116 f\left(\frac{Y}{Y_n}\right) - 16 \qquad \text{equation 15}$$

$$a^* = 500\left[f\left(\frac{X}{X_n}\right) - f\left(\frac{Y}{Y_n}\right)\right] \qquad \text{equation 16}$$

$$b^* = 200\left[f\left(\frac{Y}{Y_n}\right) - f\left(\frac{Z}{Z_n}\right)\right] \qquad \text{equation 17}$$

wherein f(n) is shown in the equation 18:

$$f(n) = \begin{cases} n^{\frac{1}{3}}, n > 0.008856 \\ 7.787n + 0.137931, \text{otherwise} \end{cases} \qquad \text{equation 18}$$

The average value of color difference of the white light images before correction is 11.4 and the average value of color difference is 2.84 after correction. As to the narrow band images, the average value before correction and the average value after correction are 29.14 and 2.58 respectively.

In the step S12, the host 10 runs the step S122. As shown in FIG. 2B, the host 10 gets an input image IMG from the image capture unit 20. Like the reference image REF, the input image IMG can be a white light image, a narrow band image, or their combinations. In this embodiment, the image capture unit 20 is a white light endoscope (OLYMPUS EVIS LUCERA CV-260 SL) which gets the corresponding white light images or a narrow band imaging endoscope (OLYMPUS EVIS LUCERA CLV-260) which gets the corresponding narrow band images. According to a preset resolution threshold, the host 10 checks whether a resolution of the input image IMG is over the resolution threshold such as 10 nanometers in the step S12. If yes, then the input image IMG is converted into a hyperspectral image (HYI) according to the hyperspectral imaging information HAS obtained in the step S10 and next the step S14 is carried out.

Next the host 10 runs the step S124: making an image analysis of the hyperspectral images HYI for feature extraction by feature points in the hyperspectral images HYI. Then a plurality of hyperspectral eigenvalues F1 is obtained according to the hyperspectral images HYI. For example, use an analysis vector to analyze the hyperspectral images HYI and get the hyperspectral eigenvalues F1. Then host 10 runs the step S126. Use principal component analysis (PCA) to compute the hyperspectral eigenvalues F1 obtained in the step S124 for simplifying values of the convolution matrix and filtering and removing the eigenvalues with lower changes. Thus, corresponding eigen vectors of the hyperspectral images HYI are simplified to generate a plurality of dimensionality reduction eigenvalues F2. The following equation 19 is the PCA equation.

$$y_i=a_{j1}(x_{1i}-\bar{x}_1)+a_{j2}(x_{2i}-\bar{x}_2)+\ldots+a_{jn}(x_{ni}-\bar{x}_n) \qquad \text{equation 19}$$

$x_{1i}$ to $x_{ni}$ represent spectrum intensity value of the first to the nth wavelength; $\bar{x}_1$ to $\bar{x}_n$ represent expected value of the spectrum (average spectrum intensity) of the first to the nth wavelength; $a_{j1}$ to $a_{jn}$ represent eigen vector coefficient of a covariance matrix giving the covariance of the spectrum. PCA is used for dimensionality reduction of 401 dimension spectrum information and only get the first three dimensions. Thus, operation complexity is reduced.

A corresponding conversion matrix M is obtained by calculation of the above correction value $[XYZ_{Correct}]$ in combination with reflection spectrum data $[R_{Spectrum}]$ corresponding to the above 24 color checkers, as shown in the following equation 20;

$$[M]=[Score] \times pinv([V_{Color}]) \qquad \text{equation 20}$$

$$[S_{Spectrum}]_{380-780}=[EV][M][V_{Color}] \qquad \text{equation 21}$$

[Score] is a plurality sets of principal components obtained by PCA of the reflection spectrum data $[R_{Spectrum}]$. In this embodiment, simulated spectrum $[S_{Spectrum}]_{380-780}$ is obtained by dimensionality reduction of 12 sets of main principal components with better explaining ability (weight percentage 88.0417%, 8.2212%, 2.6422%, 0.609%, 0.22382%, 0.10432%, 0.054658%, 0.0472%, 0.02638%, 0.012184%, 0.010952%, and 0.0028714%). An error between the simulated spectrum $[S_{Spectrum}]_{380-780}$ and $[XY-Z_{Spectrum}]$ corresponding to the input image IMG of the white light image and the narrow band image are respectively corrected from 11.60 to 2.85 and from 29.14 to 2.60. Thereby color error is hardly recognized by human eyes. Thus better color reproduction performance is provided when users need color reproduction and better hyperspectral images within visible wavelengths are simulated.

Figure 2D:
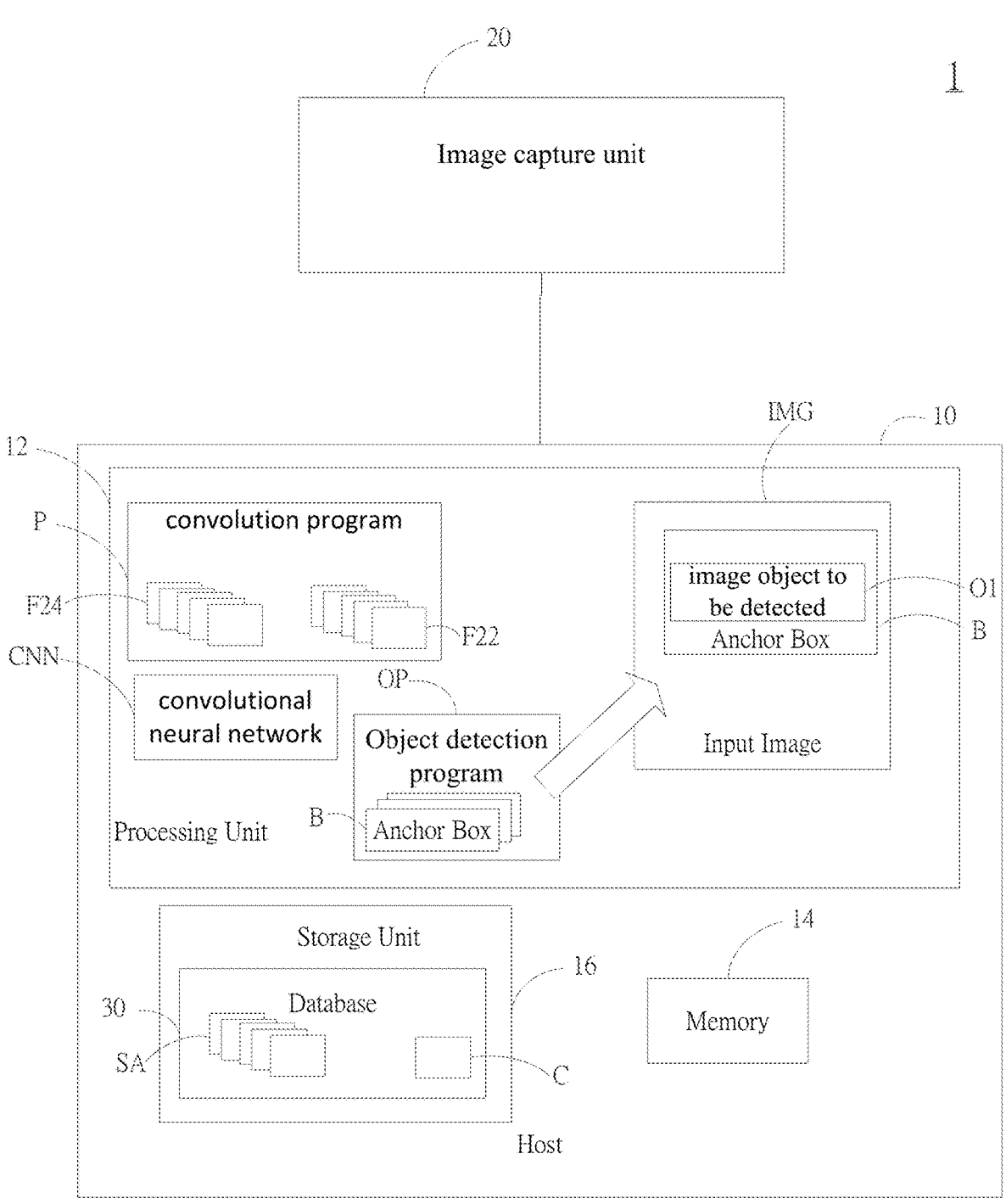
Figure 3:
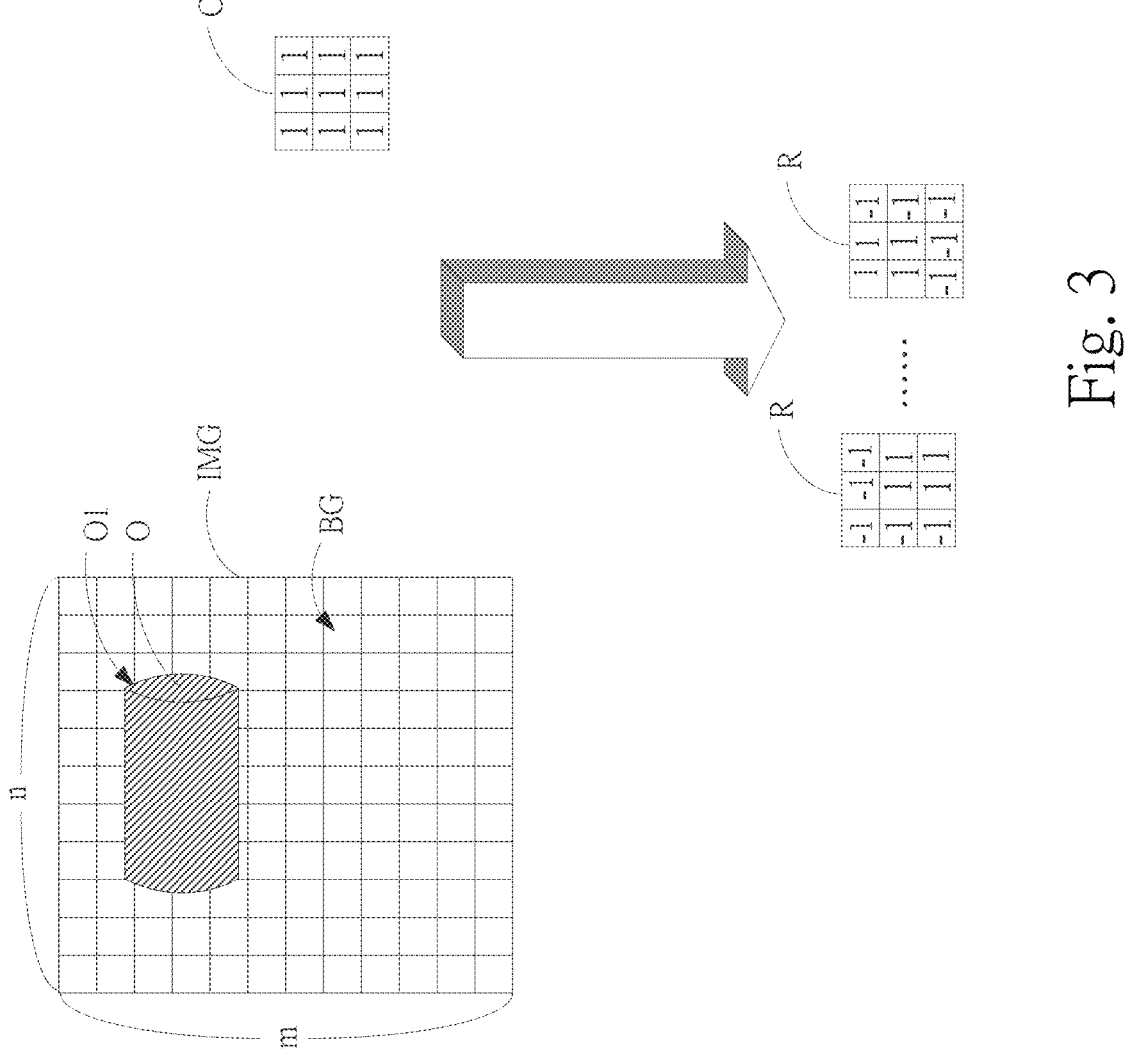
FIG. 3 shows a schematic drawing showing kernels and an input image of an embodiment according to the present invention.

In the step S14, as shown FIG. 2C, FIG. 2D and FIG. 3, the dimensionality reduction eigenvalues F2 are obtained after the input image IMG processed by the step S124 and step S126. The host 10 uses a plurality of kernels C to detect the plurality of dimensionality reduction eigenvalues F2 to which the input image IMG corresponds, especially those (F2) between 0 and 1. The kernels C include object eigenvalues F22 to which a plurality of feature images O2 of at least one image of an object to be detected O1 corresponds, and peripheral eigenvalues F24 corresponding to surrounding images BGI adjacent to the image of the object to be detected O1 for filtering out and removing background images BG without having the image of the object to be detected O1. The host 10 performs convolution operations on each pixel unit of the input image IMG using Single Shot Multibox Detector (SSD) to find the eigenvalues. The numerical value of the kernel C is its weight value. The same weight is used across the entire input image and this is the concept of shared weight.

Still refer to FIG. 2C and FIG. 3, the input image IMG includes m×n pixel units with P channels for feature extraction. Thus, the kernel C is feature weight parameter. In this embodiment, take the weight value as an example. During convolution operation, two matrices are multiplied and added. The operation way is to set a kernel size and stride. The same kernel size is run over an original image during convolution operation. Then the kernel C is moved one stride in the input layer for the next convolution operation. A convolution matrix obtained after running over the entire image is a feature map (FM) which is the feature image mentioned in this embodiment. The length and width of the feature map are associated with the kernel size and the stride. In order to maintain the size of the feature map, padding is applied to the borders of the input layer. The periphery of the input/original image is padded with zeros. The size of the output feature map is shown in the following equation 22.

$$\text{feature map size} = \qquad \text{equation 22}$$

$$\text{floor}\left(\frac{\text{input\_size} + 2 \times \text{padding} - \text{kernal\_size}}{\text{stride}}\right)$$

The kernel number is the weight value while the same weight is used across the entire input image and this is the concept of shared weight. The number of feature map channels which are affected by kernel channels, kernel number, and input channel is calculated as the equation 23 below.

$$\text{feature map channels} = \qquad \text{equation 23}$$

$$\frac{\text{input\_channel}}{\text{kernal\_channel(default = 1)}} \times \text{kernal\_number}$$

Figure 4:
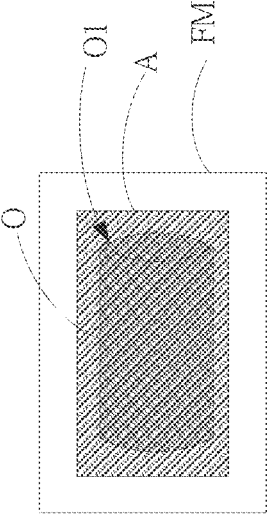
FIG. 4 shows a schematic drawing showing a feature image of an embodiment according to the present invention.

Thereby the processing of the background images BG in the following steps is reduced. The dimensionality reduction eigenvalues F2 to which the input image IMG corresponds are converted into corresponding object eigenvalues F22 by the processing unit 12. In the processing unit 12, a value of the convolution matrix R is obtained by the kernel C multiplied by the dimensionality reduction eigenvalues F2 to which the input image IMG corresponds. The value R is 1 while the same and −1 while different. Thus, images not-related are filtered out and removed. As shown in FIG. 4, get the object eigenvalues F22 by the dimensionality reduction eigenvalues F2 to which the input image IMG corresponds and then obtain at least one image of an object to be detected O1 in the feature map FM to which the object eigenvalues F22 corresponds. Thereby an area A where the image of an object to be detected O1 is located is learned.

Figure 5:
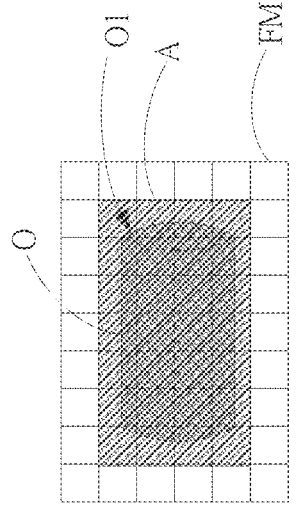
FIG. 5 shows a schematic drawing showing a feature image with grid cells of an embodiment according to the present invention.

In the step S16, as shown in FIG. 2C and FIG. 5, the host 10 extracts at least one feature image (feature map) FM from the input image IMG according to the value of the convolution matrix R by the processing unit 12 which executes an object detection program (OP). In this embodiment, take an extraction of a feature image FM as an example.

Figure 7:
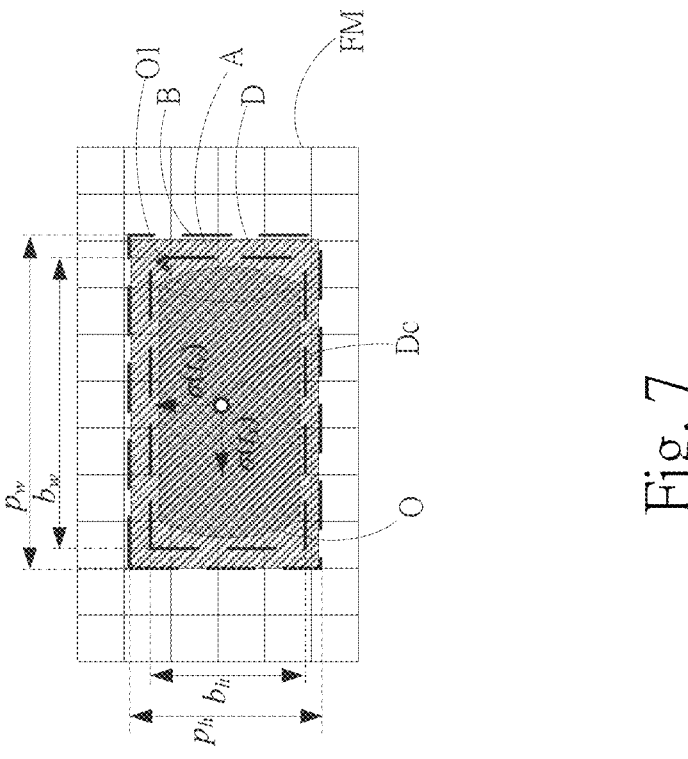
FIG. 7 shows a schematic drawing showing alignment of a prediction box with an anchor box of an embodiment according to the present invention.
Figure 6:
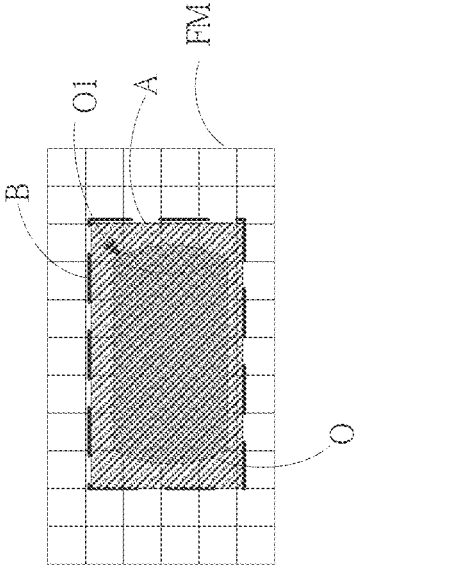
FIG. 6 shows a schematic drawing showing generation of an anchor box of an embodiment according to the present invention.

In the step S18, as shown in FIG. 2D and FIG. 6, the host 10 extracts at least one feature map FM according to the area A where the image of an object to be detected O1 is located. That means first get the object eigenvalues F22 by the object detection program (OP) and correspondingly set up at least one anchor box B in the feature map FM. As shown in FIG. 6, the anchor box B are n sets of boxes for prediction of the aspect ratio (a ratio between the length and the width) and pre-saved in the host 10. For example, take the anchor box B having the aspect ratio of 2:1 in this embodiment as an example. The anchor box B is set in the area A with adaptive zoom-in techniques to extract positioning parameters of the feature image (feature map FM). As shown in FIG. 7, in the next step S20, a prediction box D is set according to the position of the anchor box B in the feature image FM and corresponds to the image of an object to be detected O1.

Figure 2E:
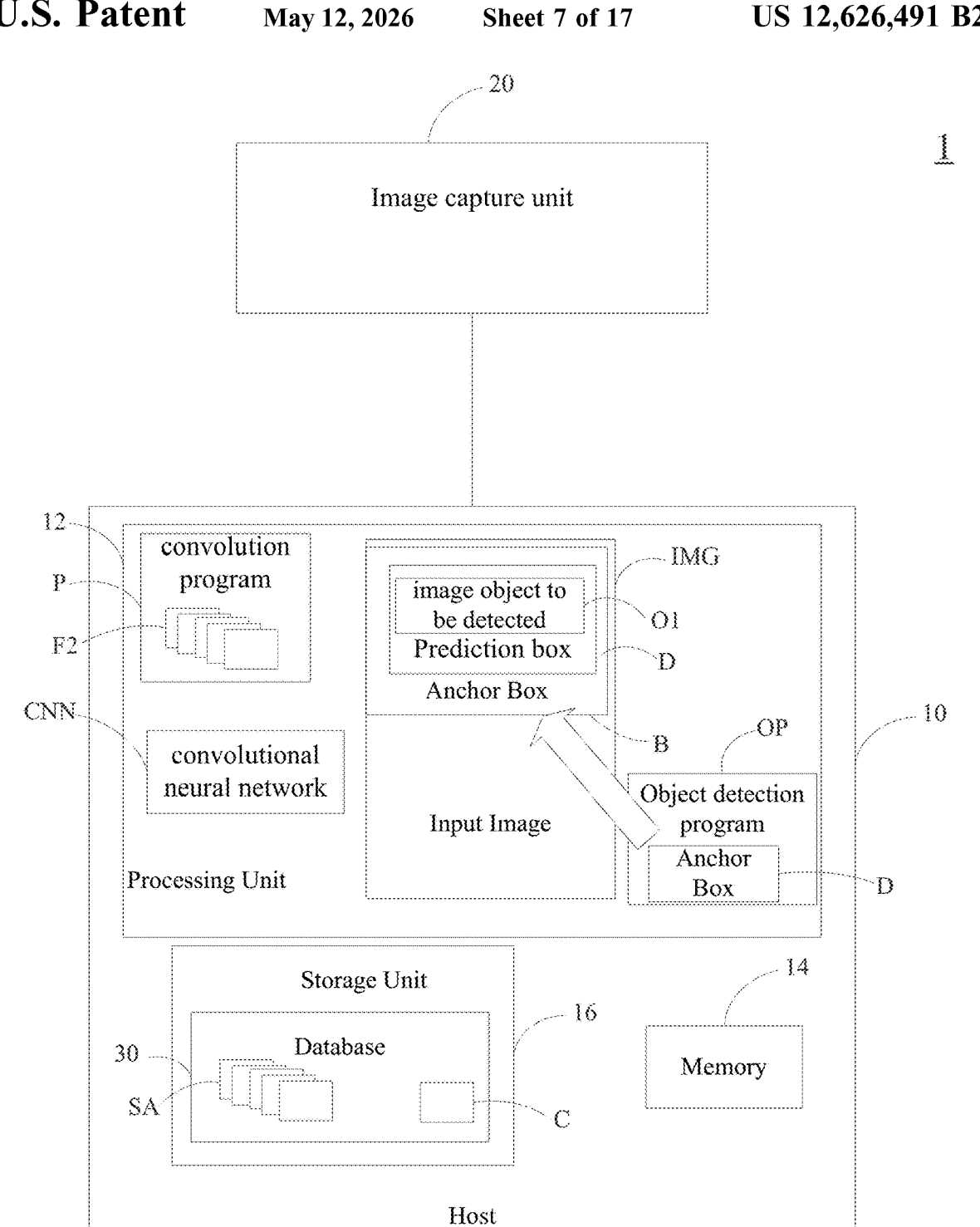

In the step S20, as shown in FIG. 2E and FIG. 7, by the object detection program (OP) executed by the processing unit 12, the host 10 sets up a corresponding prediction box D in the feature map FM according to the anchor box B to which the feature map FM corresponds. The setting of the prediction box D is calculated below.

$$\text{position of prediction box D } b=(b_x,b_y,b_w,b_h) \qquad \text{equation 24}$$

$$b_x=\sigma(t_x)+C_x \qquad \text{equation 25}$$

$$b_y=\sigma(t_y)+C_y \qquad \text{equation 26}$$

$$b_w=p_we^{t_w} \qquad \text{equation 27}$$

$$b_h=p_he^{t_h} \qquad \text{equation 28}$$

First a central coordinate of the anchor box B is aligned with a central coordinate of the prediction box D. That means the central point Dc of the anchor box B is translated to bounding coordinates of the prediction box D, as shown in equation 26 to equation 28. Then the bounding coordinates of the prediction box D are approaching the image of the object to be detected O1 according to the aspect ratio of the anchor box B.

In order to define the position of the image of the object to be detected O1 more precisely, a loss equation 29 below is further used.

$$L_{BCEWithLogitsLoss} = -w[y_{n,c}\cdot\log(\sigma(x_{n,c})) + (1-y_{n,c})\cdot\log(1-\sigma(x_{n,c}))] \qquad \text{equation 29}$$

Thus, an error between the position of the prediction box D and the position of the image of the object to be detected O1 is identified.

Figure 2F:
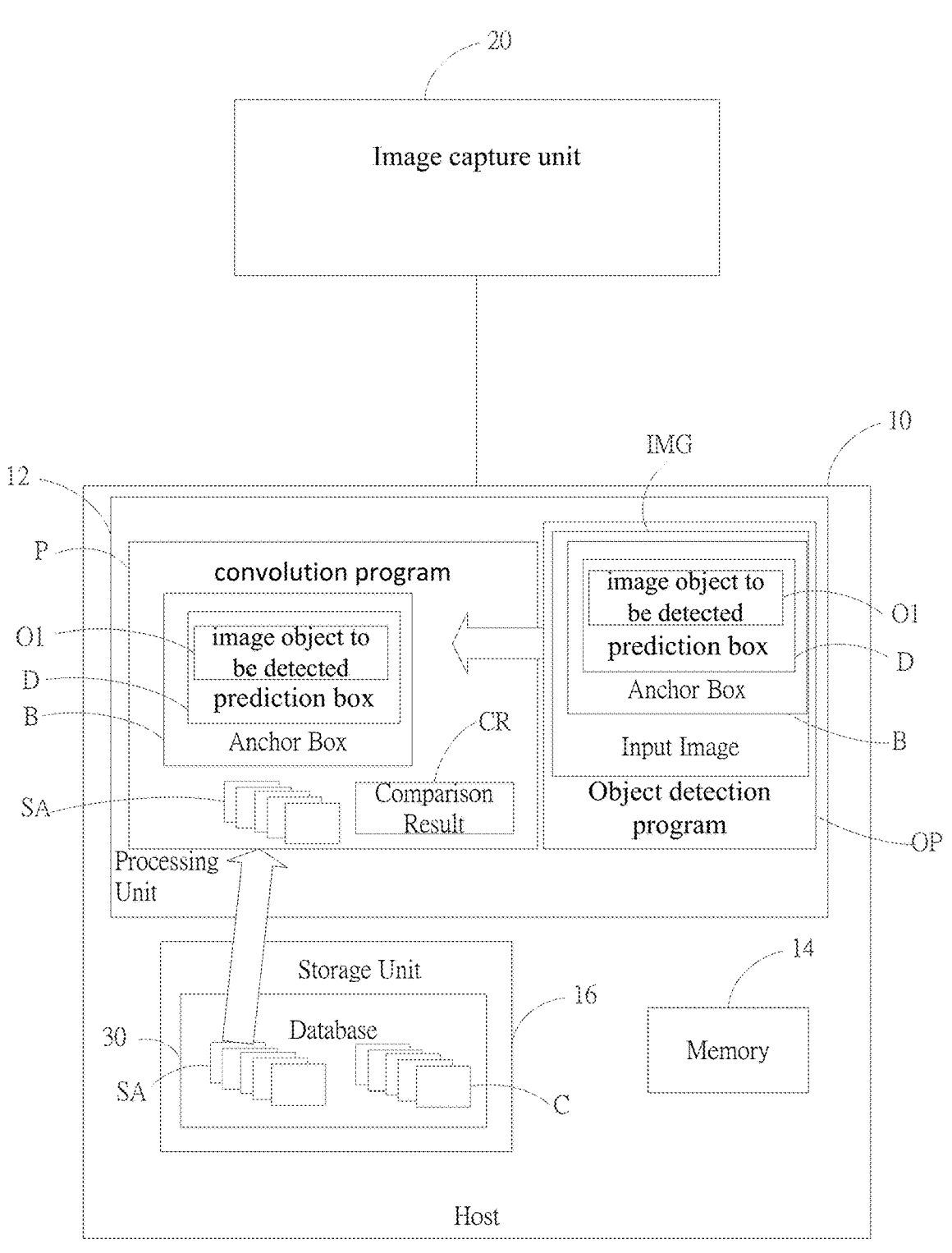

In the step S22, as shown in FIG. 2F and FIG. 7, the processing unit 12 of the host 10 gets a bounded image corresponding to the prediction box D (the bounded image of the object to be detected O1) after positioning the image of the object to be detected O1 according to the prediction box D. In the step S16-22, the processing unit 12 of the host 10 runs the object detection program (OP). That means to detect objects by an object detection algorithm YOLOv5 which bounds and selects the image of the object to be detected O1 from the feature image (feature map) FM. For example, the object detection algorithm YOLOv5 which is an artificial neural network includes a convolution (cony) module, a FOCUS module, a C3 module and a Spatial Pyramid Pooling (SPP) module.

Figures 8A, 8B, 8C, 8D, 8E, 8F, 8G, 8H, 8I, 8J:
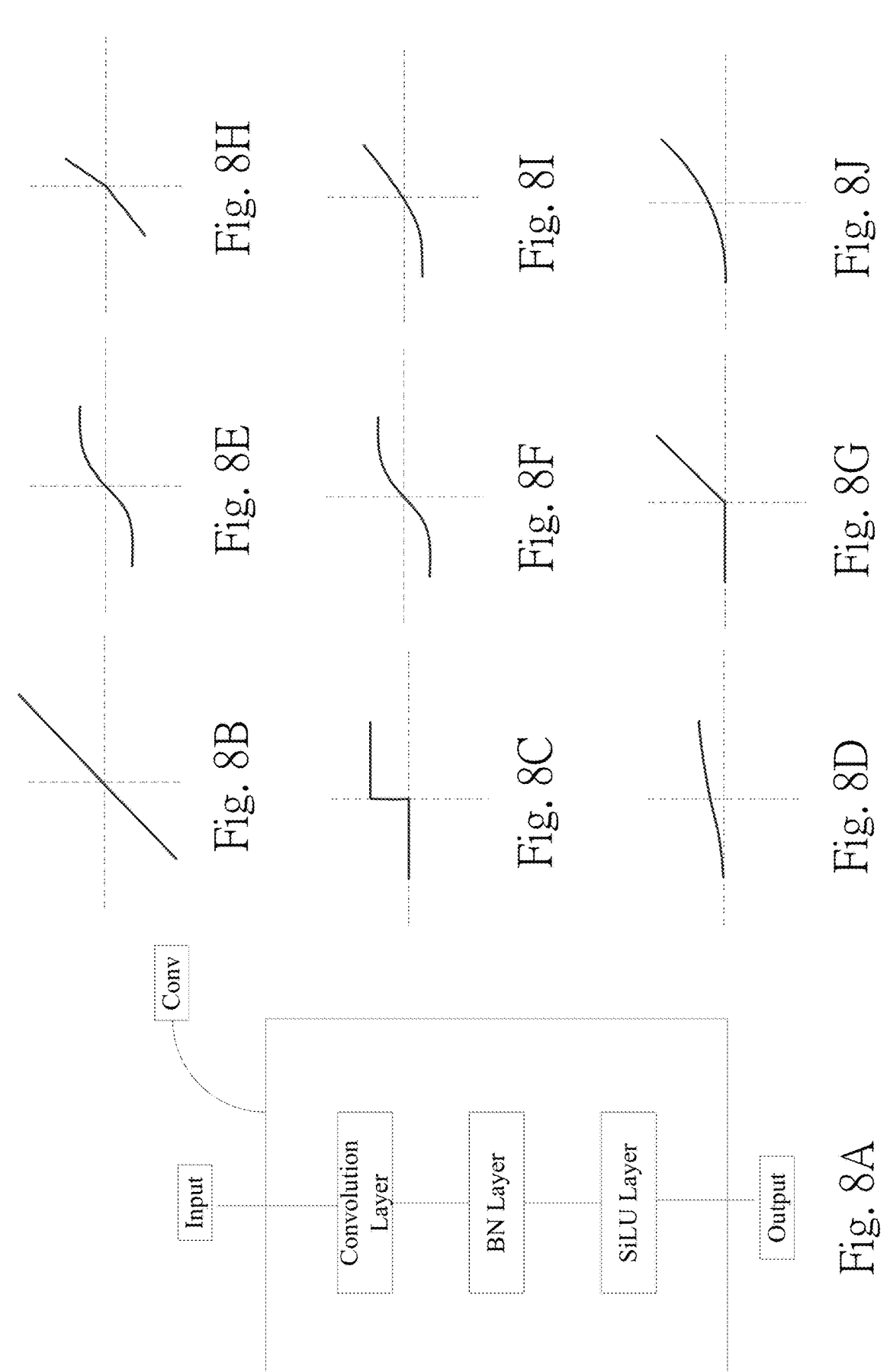
FIG. 8A shows a schematic drawing showing a convolution module of an embodiment according to the present invention.
FIG. 8B shows a function graph of the identity function.
FIG. 8C shows a function graph of the unit step function.
FIG. 8D shows a function graph of the logical function.
FIG. 8E shows a function graph of the hyperbolic tangent function.
FIG. 8F shows a function graph of the inverse tangent function.
FIG. 8G shows a function graph of the Rectified Linear Unit (ReLU) activation function.
FIG. 8H shows a function graph of the Parametric Rectified Linear Unit (PReLU) activation function.
FIG. 8I shows a function graph of the exponential linear unit (ELU) activation function.
FIG. 8J shows a function graph of the SoftPlus function.

As shown in FIG. 8A, the convolution module includes a set of convolution layers, a batch normalization (BN) layer and an activation function (SiLu) layer. The convolution module extracts image features or changes the size of the feature map for feature fusion (Concat) by convolution. The common activation functions are listed in the following table.

TABLE 1

| common activation functions | | |
|---|---|---|
| name | equation | derivative |
| identity function | $f(x) = x$ | $f'(x) = 1$ |
| unit step function | $f(x) = \begin{cases} 0 & \text{for } x < 0 \\ 1 & \text{for } x \geq 0 \end{cases}$ | $f'(x) = \begin{cases} 0 & \text{for } x = 0 \\ ? & \text{for } x \neq 0 \end{cases}$ |
| logical function | $f(x) = \dfrac{1}{1 + e^{-x}}$ | $f'(x) = f(x)(1 - f(x))$ |
| hyperbolic tangent function | $f(x) = \tanh(x) = \dfrac{2}{1 + e^{-2x}} - 1$ | $f'(x) = 1 - f(x)^2$ |
| inverse tangent function | $f(x) = \tan^{-1}(x)$ | $f'(x) = \dfrac{1}{x^2 + 1}$ |
| Rectified Linear Unit (ReLU) activation function | $f(x) = \begin{cases} 0 & \text{for } x < 0 \\ x & \text{for } x \geq 0 \end{cases}$ | $f'(x) = \begin{cases} 0 & \text{for } x < 0 \\ 1 & \text{for } x \geq 0 \end{cases}$ |
| Parametric Rectified Linear Unit (PReLU) activation function | $f(x) = \begin{cases} \alpha x & \text{for } x < 0 \\ x & \text{for } x \geq 0 \end{cases}$ | $f'(x) = \begin{cases} \alpha & \text{for } x < 0 \\ 1 & \text{for } x \geq 0 \end{cases}$ |
| exponential linear unit (ELU) activation function | $f(x) = \begin{cases} \alpha(e^x - 1) & \text{for } x < 0 \\ x & \text{for } x \geq 0 \end{cases}$ | $f'(x) = \begin{cases} f(x) + \alpha & \text{for } x < 0 \\ 1 & \text{for } x \geq 0 \end{cases}$ |
| SoftPlus function | $f(x) = \log_e(1 + e^x)$ | $f'(x) = \dfrac{1}{1 + e^{-x}}$ |
| bent identity function | $f(x) = \dfrac{\sqrt{x^2 - 1} - 1}{2} + x$ | $f'(x) = \dfrac{x}{2\sqrt{x^2 + 1}} + 1$ |
| SoftExponential function | $f(x, \alpha) = \begin{cases} -\dfrac{\log_e(1 - \alpha(x + \alpha))}{\alpha} & \text{for } \alpha < 0 \\ x & \text{for } \alpha = 0 \\ \dfrac{e^{\alpha x} - 1}{\alpha} + \alpha & \text{for } \alpha > 0 \end{cases}$ | $f(x, \alpha) = \begin{cases} \dfrac{1}{1 - \alpha(x + \alpha)} & \text{for } \alpha < 0 \\ e^{\alpha x} & \text{for } \alpha \geq 0 \end{cases}$ |
| sine function | $f(x) = \sin(x)$ | $f'(x) = \cos(x)$ |
| Sinc function | $f(x) = \begin{cases} 1 & \text{for } x = 0 \\ \dfrac{\sin(x)}{x} & \text{for } x \neq 0 \end{cases}$ | $f'(x) = \begin{cases} 0 & \text{for } x = 0 \\ \dfrac{\cos(x)}{x} - \dfrac{\sin(x)}{x^2} & \text{for } x \neq 0 \end{cases}$ |
| Gaussian function | $f(x) = e^{-x^2}$ | $f'(x) = -2xe^{-x^2}$ |

Figures 8K, 8L, 8M, 8N, 8O, 9:
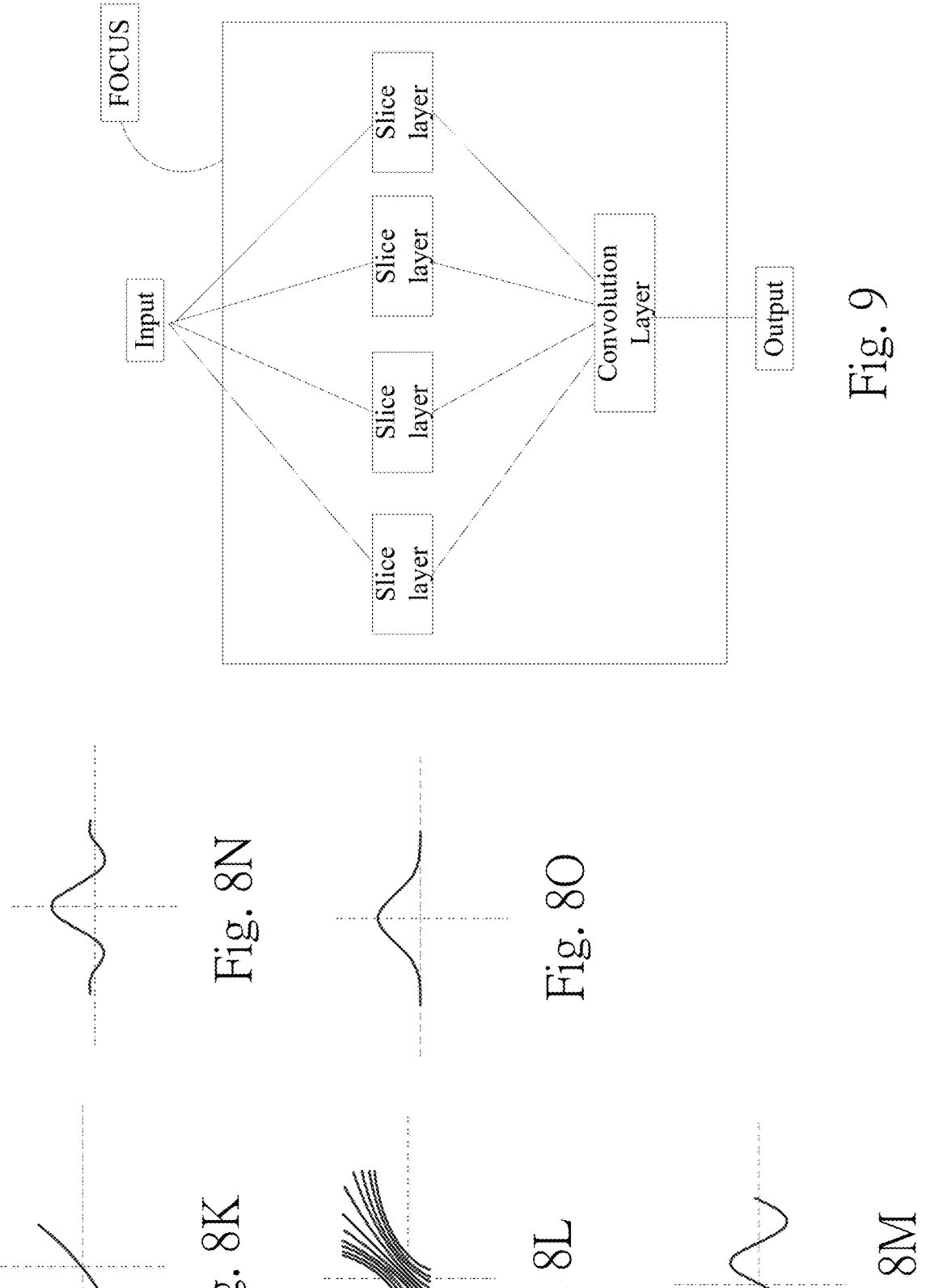
FIG. 8K shows a function graph of the bent identity function.
FIG. 8L shows a function graph of the SoftExponential function.
FIG. 8M shows a function graph of the sine function.
FIG. 8N shows a function graph of the Sinc function.
FIG. 8O shows a function graph of the Gaussian function.
FIG. 9 shows a schematic drawing showing a FOCUS module of an embodiment according to the present invention.

As shown in FIG. 8B to FIG. 8O, function graphs of the identity function, the unit step function, the logical function, the hyperbolic tangent function, the inverse tangent function, the Rectified Linear Unit (ReLU) activation function, the Parametric Rectified Linear Unit (PReLU) activation function, the exponential linear unit (ELU) activation function, the SoftPlus function, the bent identity function, the SoftExponential function, the sine function, the Sinc function, and the Gaussian function.

Figure 10:
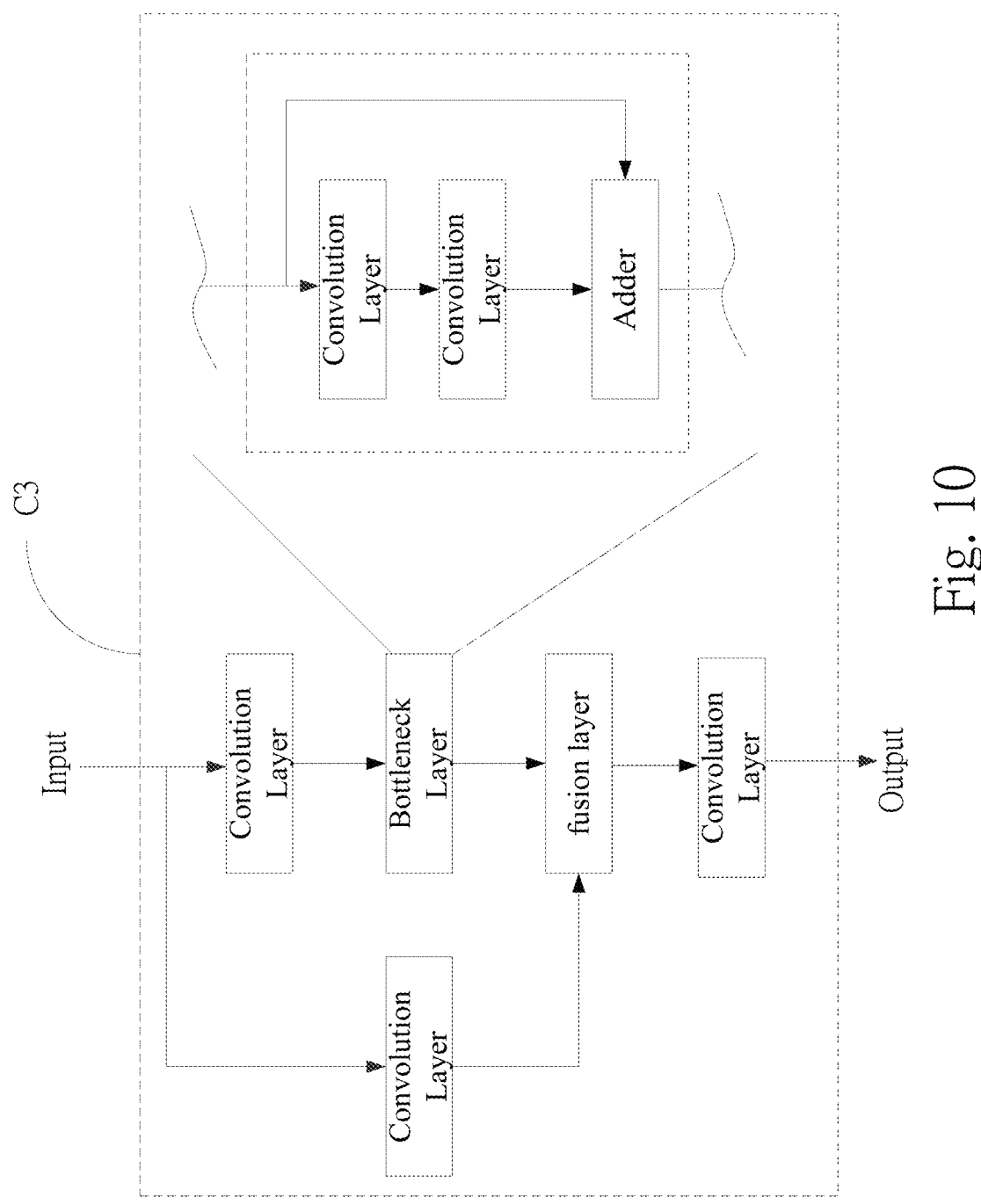
FIG. 10 shows a schematic drawing showing a C3 module of an embodiment according to the present invention.
Figure 11:
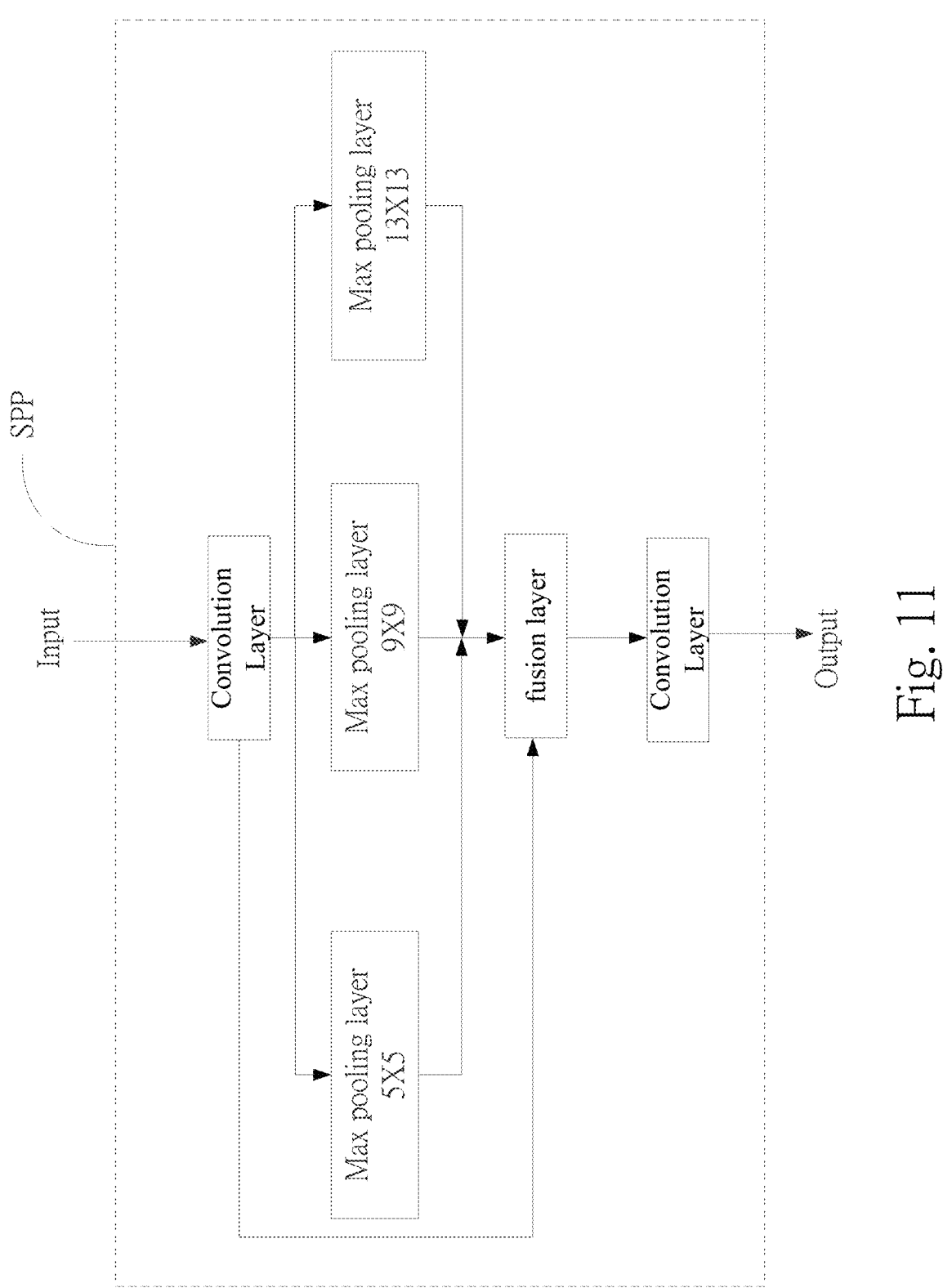
FIG. 11 shows a schematic drawing showing a SPP module of an embodiment according to the present invention.

As shown in FIG. 9, for input into a plurality of slice layers in the FOCUS module, the feature image is treated by slice operation using pixel points with a distance of 2 and integrate the aspect ratio into the channel dimensions. The method is similar to feature fusion of images of different sizes but only one convolution layer is used to optimize feature extraction ability in order to reduce the amount of computation and further improve the computational speed. Refer to FIG. 10, the C3 module is formed by modification of Cross-Stage Partial Network CSPNet. In the C3 module, the input is divided into two parts. After being output by a designed network completely, combination of features of one of the two parts with the other part is carried out (concat). Thereby such method keeps as much features of the base layers as possible to solve vanishing gradient problems effectively. This means the issues such as loss of useful information in image data at a rear-part of convolution layer caused by poor feature extraction process and backpropagation for optimization of the performance of the network is unlikely to be used are addressed. Compared with CSPNet, the C3 module further reduces the amount of computation. Refer to FIG. 11, the Spatial Pyramid Pooling (SPP) module performs feature fusion (concat) of feature image by three max-pooling layers of different sizes and a 1×1 convolutional layer. Thereby feature information of the targets with different sizes can be effectively separated for later use. In YOLOv5, SPP performs calculation at three scales [5, 9, 13]. Moreover, YOLOv5 improves the detection precision by Feature Parymid Network (FPN) and Path Aggregation Network (PANet). Through the structure of FPN, the YOLOv5 performs feature fusion of the shallow and the down-sampling feature matches for effective detection of small targets. Similarly, the YOLOv5 performs feature fusion of the up-sampling feature matches to avoid feature loss in the middle-and-back-end computation of the neural network architecture.

Figure 2G:
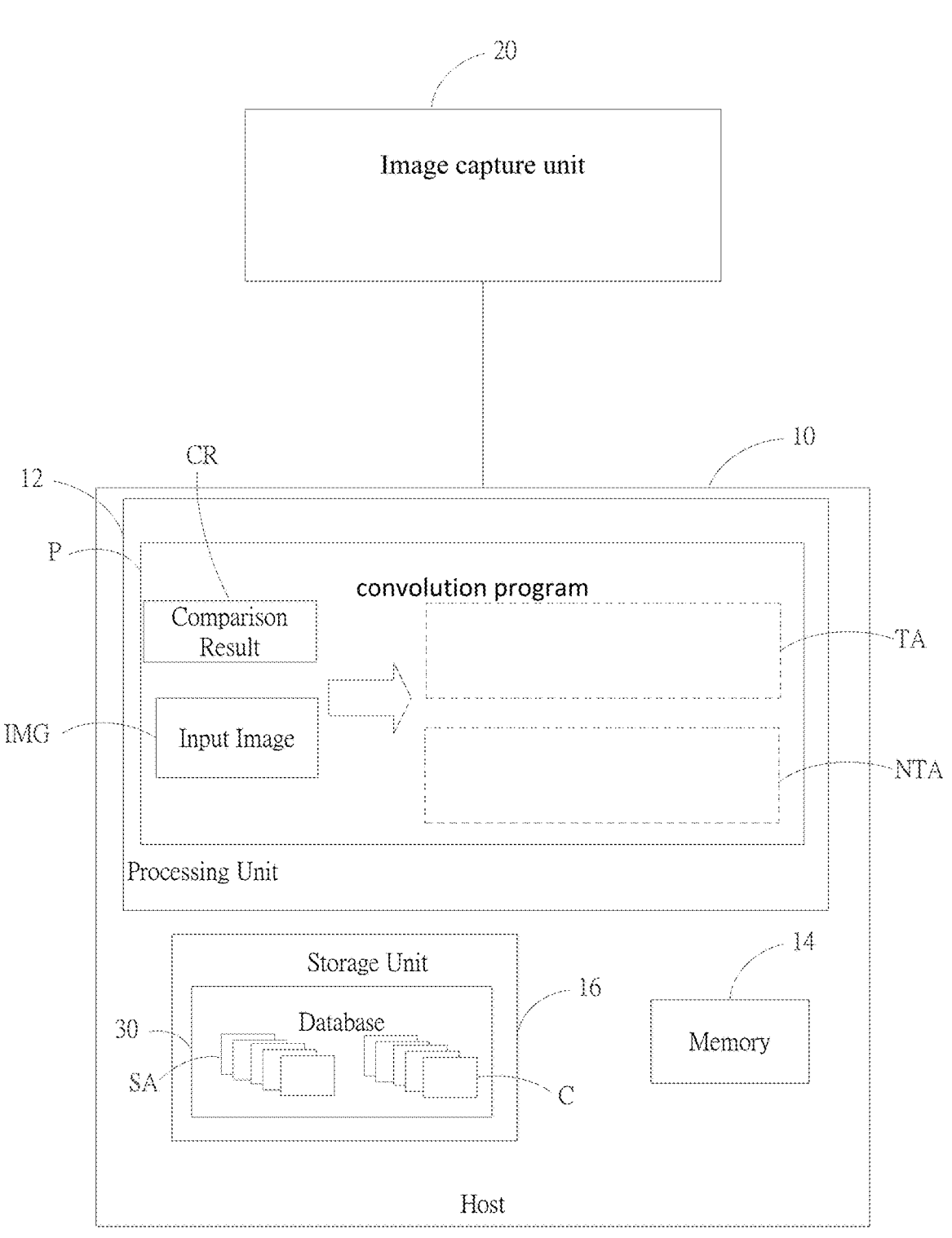

In the step S24, the host 10 matches and compares the image of the object to be detected O1 bounded by the prediction box D with a sample image SA in the database 30 to get a comparison result CR. As shown in FIG. 2G, the processing unit 12 of the host 10 runs a convolution program P to classify the input image IMG into a target object image TA or a non-target object image NTA such as malignant tumor according to the comparison result CR. When the convolution program P executed by the processing unit 12 of the host 10 can't recognize and match the image of the object to be detected O1 in the prediction box D with at least one sample image SA, the host 10 classifies the input image IMG into the non-target object image NTA. Otherwise the processing unit 12 of the host 10 runs the convolution program P to classify the input image IMG into the target object image TA. Moreover, once the processing unit 12 of the host 10 runs the convolution program P and classifies the input image IMG into the non-target object image NTA, the convolution program P runs the second time to compare at least one sample image SA with the image of the object to be detected O1. When the convolution program P checks that a similarity of the comparison result CR of the image of the object to be detected O1 to the target object image TA is larger than a similarity threshold (for example, the similarity threshold is 0.5 while the similarity is between 0 and 1), the convolution program P classifies the input image IMG into the target object image TA. Otherwise the convolution program P classifies the input image IMG into the non-target object image NTA.

Figure 12:
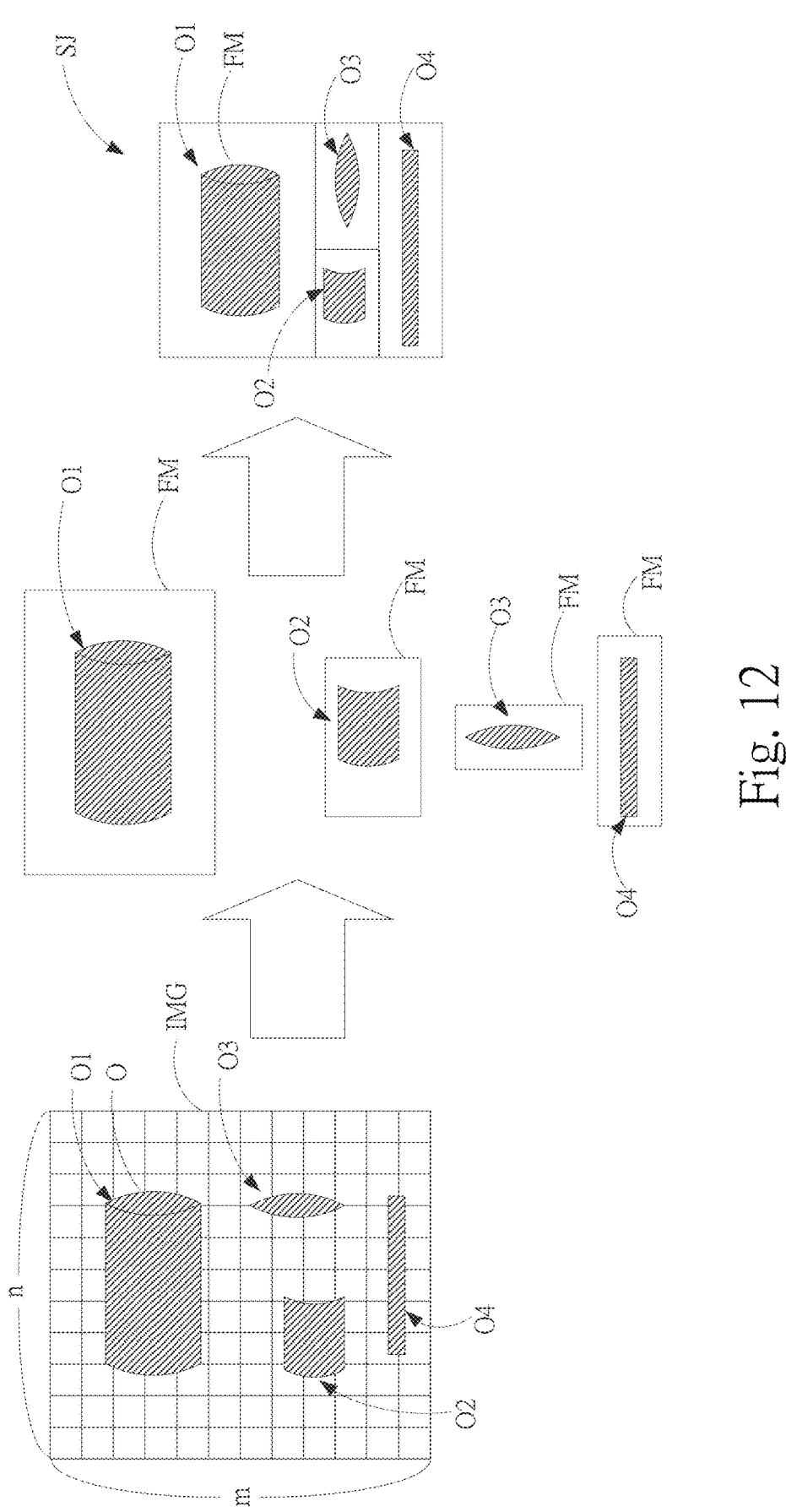
FIG. 12 shows a schematic drawing showing operation of an embodiment according to the present invention.

In another embodiment, as shown in FIG. 12, in the step S14, the host 10 extracts a plurality of features images (feature maps, FM) according to input images IMG of different objects to be detected O1, O2, O3, and O4 and then performs random zooming, random cropping, and random arrangement of these feature matches FM for connecting the feature matches FM to form a split joint (SJ) image. The host 10 continues to run the step S16 by using the split joint (SJ) image. Thus, the amount of computation of the object detection program (OP) executed by the processing unit 12 can be reduced once the amount of the feature matches is greater. In this embodiment, the images of the different objects to be detected O1, O2, O3, and O4 are in a single input image IMG. The images of the objects to be detected O1, O2, O3, and O4 can also be in different input images IMG.

Refer back to FIG. 1A-1C and FIG. 2A-2G, first the reference image REF is captured by the image capture unit 20 and sent to the host 10. Then the host 10 gets the hyperspectral image information HSA to which the reference image REF corresponds. The image capture unit 20 captures the input image IMG and sends the input image IMG to the host 10 so that the host 10 converts the input image IMG into the hyperspectral image HYI according to the hyperspectral image information HSA. According to the feature points of the hyperspectral image HYI, the host 10 makes an image analysis and extracts the hyperspectral eigenvalues F1. The host 10 computes the hyperspectral eigenvalues F1 by using principal component analysis (PCA) to simplify the hyperspectral eigenvalues F1 and generate corresponding dimensionality reduction eigenvalues F2. Thereby the host 10 extracts the feature image (feature map) FM from the input image IMG and generates a plurality of grid cells according to the feature image FM. Then the corresponding anchor box B is set up on the input image IMG by these grid cells. The anchor box B has a preset aspect ratio (a ratio between the length and the width). Thus, the host 10 selects the anchor box B to which the feature map/image FM corresponds and extracts the positioning parameters of the corresponding object to be detected O so as to set up the corresponding prediction box D on the input image IMG.

Next the bounded image is obtained from the feature map FM according to the prediction box D. That means the image of the object to be detected O1 is bounded and selected from the feature map FM according to the prediction box D to be matched and compared with the sample image SA in the database 30. The processing unit 12 of the host 10 runs the convolution program P to match and compare the image of the object to be detected O1 bounded and selected by the prediction box D with the sample image SA for obtaining the comparison result CR. Then the processing unit 12 of the host 10 determines the input image IMG is an image of tumor cells with infiltration in epithelial tissue at early-stage esophageal cancer according to the comparison result CR. Thereby doctors can analyze the endoscopic images and make an accurate diagnosis with the assistance of the present method. Therefore, the doctors can offer the following treatment options and human errors in endoscopic image analysis are minimized.

In summary, a method for detecting objects in hyperspectral imaging according to the present invention gets hyperspectral image information by the host. Then the input image is converted into the hyperspectral image according to the hyperspectral imaging information. Next run the convolution program and constructs the convolutional neural network by the host in order to perform convolution on the input image capture by the image capture unit. Thus, the feature image to be detected is filtered out. Thereby the anchor box and the prediction box are set up on the input image and the position of the image of the object to be detected is localized by the prediction box. Lastly compare the bounded image with the sample image to get the comparison result by which the input image is classified into the target object image or the non-target object image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for detecting objects in hyperspectral imaging, comprising, in a host:

obtaining hyperspectral imaging information relating to a reference hyperspectral image, the reference hyperspectral image having been converted from a reference image captured by an endoscope;

obtaining an input image captured by the endoscope;

converting the input image based on the hyperspectral imaging information to obtain a hyperspectral image of the input image;

executing an image analysis of the hyperspectral image of the input image to obtain a plurality of hyperspectral eigenvalues from the hyperspectral image of the input image;

executing a principal component analysis (PCA) to simplify the plurality of hyperspectral eigenvalues and obtain a plurality of dimensionality reduction eigenvalues from the simplified hyperspectral eigenvalues;

obtaining a value of a convolution matrix based on the dimensionality reduction eigenvalues, a kernel, and at least one convolutional layer, wherein the kernel includes a plurality of feature weight parameters, and the value of the convolution matrix is obtained by multiplying the plurality of feature weight parameters of the kernel with the plurality of dimensionality reduction eigenvalues;

extracting a plurality of feature images from the input image based on the value of the convolution matrix;

executing zooming, cropping, and arrangement of the plurality of feature images to connect the plurality of feature images and form a joint image;

generating a plurality of grid cells based on the joint image;

setting at least one anchor box on the input image based on the plurality of grid cells and extracting a plurality of positioning parameters corresponding to the plurality of feature images;

setting at least one prediction box on the input image based on the plurality of positioning parameters;

obtaining at least one bounded image from the plurality of feature images based on the prediction box;

comparing the at least one bounded image with at least one sample image to generate a comparison result; and determining whether the input image is a target object image or not based on the comparison result.

2. The method as claimed in claim 1, wherein the host compares the bounded image with the sample image to generate the comparison result by an object detection algorithm YOLOv5.

3. The method as claimed in claim 1, wherein the hyperspectral imaging information includes a plurality of color matching functions, a correction matrix, and a conversion matrix each corresponding to the input image.

4. The method as claimed in claim 1, wherein the host reads the sample image from a database for comparing with the at least one bounded image.

5. The method as claimed in claim 1, wherein the host sets the plurality of grid cells on the input image for positioning the anchor box based on the grid cells, and the anchor box corresponds to at least one ratio between a length and a width.

6. The method as claimed in claim 1, a plurality of prediction boxes is generated by the host respectively based on a plurality of anchor boxes of different target sizes.

7. The method as claimed in claim 1, wherein the host aligns a central coordinate of the at least one prediction box based on a central coordinate of the anchor box and approaches a bounding coordinates of the at least one prediction box based on an aspect ratio of the anchor box.

8. The method as claimed in claim 7, wherein the host sets the at least one prediction box in a plurality of scales including $\frac{1}{8}$, $\frac{1}{16}$, $\frac{1}{32}$, and a combination thereof based on an object detection algorithm YOLOv5.

9. The method as claimed in claim 1, wherein in the principal component analysis (PCA), the host extracts a maximum variance based on a hyperspectral vector to which the hyperspectral eigenvalues correspond and then the dimensionality reduction eigenvalues are generated.

10. The method as claimed in claim 1, wherein the image analysis extracts a plurality of feature points in the hyperspectral image to obtain the plurality of hyperspectral eigenvalues.

11. The method as claimed in claim 1, wherein an object to be detected in the input image is bounded by the at least one prediction box.

* * * * *